US012560971B2

(12) United States Patent
Kim et al.

(10) Patent No.: US 12,560,971 B2
(45) Date of Patent: Feb. 24, 2026

(54) DISPLAY DEVICE AND MANUFACTURING METHOD THEREOF

(71) Applicant: Samsung Display Co., Ltd., Yongin-si (KR)

(72) Inventors: Onnuri Kim, Hwaseong-si (KR); Younghye Son, Seoul (KR); Sang-Gu Lee, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 316 days.

(21) Appl. No.: 18/094,609

(22) Filed: Jan. 9, 2023

(65) Prior Publication Data

US 2023/0273646 A1    Aug. 31, 2023

(30) Foreign Application Priority Data

Feb. 28, 2022    (KR) ........................ 10-2022-0026347

(51) Int. Cl.
*B32B 7/12* (2006.01)
*G06F 1/16* (2006.01)

(52) U.S. Cl.
CPC ............. *G06F 1/1656* (2013.01); *B32B 7/12* (2013.01); *G06F 1/1652* (2013.01); *B32B 2457/206* (2013.01); *G02F 2202/22* (2013.01); *G02F 2202/28* (2013.01)

(58) Field of Classification Search
CPC ................. G06F 1/1603; G06F 1/1626; G06F 1/1637–1654; G06F 1/1656; G06F 1/1658; H04M 1/0214; H04M 1/0216; H04M 1/0222; H04M 1/0266; H04M 1/0268; H04M 1/0269; G09F 9/301; G02F 1/133302; G02F 1/133305; G02F 1/133308; G02F 1/133311; G02F 1/133331; G02F 2202/22; G02F 2202/28; B32B 7/12
See application file for complete search history.

(56) References Cited

U.S. PATENT DOCUMENTS

| | | | |
|---|---|---|---|
| 8,906,989 B2 | 12/2014 | Watanabe et al. | |
| 9,879,158 B2 | 1/2018 | Kubo et al. | |
| 10,280,341 B2 | 5/2019 | Ogasawara et al. | |
| 10,945,343 B2 | 3/2021 | Yoon et al. | |
| 2005/0064154 A1* | 3/2005 | Aylward ................ | G03G 7/008 |
| | | | 428/195.1 |
| 2010/0020398 A1* | 1/2010 | Horio ................ | G02F 1/133528 |
| | | | 359/488.01 |

(Continued)

FOREIGN PATENT DOCUMENTS

| | | |
|---|---|---|
| KR | 1020140025511 A | 3/2014 |
| KR | 1020140118913 A | 10/2014 |

(Continued)

*Primary Examiner* — Z. Jim Yang
(74) *Attorney, Agent, or Firm* — CANTOR COLBURN LLP

(57) ABSTRACT

A display device includes: a display panel including a display area and a non-display area surrounding the display area, a window on the display panel, and an adhesive layer disposed on the display panel and including an ionic surfactant. The adhesive layer includes a first surface adjacent to the window, a second surface facing the first surface, and a first portion in which a concentration of the ionic surfactant increases in a direction from the first surface toward the second surface.

12 Claims, 17 Drawing Sheets

(56)　　　　　　References Cited

U.S. PATENT DOCUMENTS

| | | | | |
|---|---|---|---|---|
| 2010/0028564 A1* | 2/2010 | Cheng | G02B 5/3025 | |
| | | | | 428/697 |
| 2017/0037285 A1* | 2/2017 | Choi | C08L 33/06 | |
| 2019/0064615 A1* | 2/2019 | Lim | G02F 1/133528 | |
| 2020/0108586 A1* | 4/2020 | Ryu | B32B 37/18 | |
| 2020/0266368 A1* | 8/2020 | Park | B32B 17/10027 | |
| 2020/0295297 A1* | 9/2020 | Jo | H10K 77/111 | |
| 2021/0238402 A1* | 8/2021 | Kouka | C09J 11/06 | |
| 2021/0259093 A1* | 8/2021 | Park | H05K 1/028 | |
| 2022/0037601 A1* | 2/2022 | Lee | H10K 59/12 | |
| 2022/0208030 A1* | 6/2022 | Kim | G02B 1/11 | |
| 2023/0174826 A1* | 6/2023 | Pang | C09J 7/385 | |
| | | | | 359/507 |
| 2023/0203347 A1* | 6/2023 | Katami | B32B 27/08 | |
| | | | | 428/40.1 |
| 2024/0015940 A1* | 1/2024 | Yang | H10K 59/8791 | |

FOREIGN PATENT DOCUMENTS

| | | | |
|---|---|---|---|
| KR | 1020170083029 A | 7/2017 | |
| KR | 102188938 B1 | 12/2020 | |

\* cited by examiner

DISPLAY DEVICE AND MANUFACTURING METHOD THEREOF

This application claims priority to Korean Patent Application No. 10-2022-0026347, filed on Feb. 28, 2022, and all the benefits accruing therefrom under 35 U.S.C. § 119, the content of which in its entirety is herein incorporated by reference.

BACKGROUND

The present disclosure herein relates to a display device and a manufacturing method thereof, and more particularly, to a foldable display device and a manufacturing method thereof.

Various types of display devices are used for providing image information, and such a display device may be divided into a display area corresponding to an active area and a non-display area in which a control unit such as a circuit board for controlling active areas is disposed.

The structure of a flexible display device is proposed in which the non-display area is minimized or bent for increasing visibility and reducing a dead space. Meanwhile, even in a case where the dead space is reduced, in order for the display device to have good durability, it is desirable to improve the reliability of an adhesive member used for combining components of the display device.

SUMMARY

The present disclosure provides a display device with improved reliability and durability by adjusting an angle of contact between a target substrate and an adhesive layer using an electro-dewetting phenomenon, and a manufacturing method thereof.

An embodiment of the invention provides a display device including: a display panel including a display area and a non-display area surrounding the display area; a window on the display panel; and an adhesive layer disposed on the display panel and including an ionic surfactant, where the adhesive layer includes a first surface adjacent to the window, a second surface facing the first surface, and a first portion in which a concentration of the ionic surfactant increases in a direction from the first surface toward the second surface.

In an embodiment, the first portion may overlap the non-display area.

In an embodiment, the adhesive layer may further include a second portion adjacent to the first portion, wherein, in the second portion, a concentration of the ionic surfactant may be uniform in a thickness direction of the adhesive layer.

In an embodiment, the second portion may overlap the display area.

In an embodiment, the first portion may surround the second portion in a view in the thickness direction.

In an embodiment, the first portion may include: a first sub-adhesive unit including the first surface; and a second sub-adhesive unit including the second surface, where a concentration of the ionic surfactant in the second sub-adhesive unit is greater than a concentration of the ionic surfactant in the first sub-adhesive unit.

In an embodiment, the first sub-adhesive unit may not include the ionic surfactant.

In an embodiment, the adhesive layer may be disposed between the display panel and the window.

In an embodiment, the adhesive layer may be disposed on the window.

In an embodiment, the display device may further include a protection film between the display panel and the window, wherein the adhesive layer is disposed between the display panel and the protection film, or between the window and the protection film.

In an embodiment, the adhesive layer may be disposed between the window and the protection film, and the display device may further include an additional adhesive layer disposed between the display panel and the protection film and including the ionic surfactant, wherein the additional adhesive layer may include a third surface adjacent to the protection film, a fourth surface facing the third surface, and a third portion in which a concentration of the ionic surfactant increases in a direction from the third surface toward the fourth surface.

In an embodiment, the ionic surfactant may include at least one among dodecyl trimethyl ammonium bromide, cetyltrimethyl ammonium bromide, tetradecyltrimethylammonium bromide, sodium dodecyl sulfate.

In an embodiment of the invention, a display device includes: a display panel including display area and a non-display area surrounding the display area; a window on the display panel; and an adhesive layer disposed between the display panel and the window and including an ionic surfactant, wherein a concentration of the ionic surfactant increases in a direction from one surface of the adhesive layer adjacent to the window toward an opposite surface of the adhesive layer adjacent to the display panel.

In an embodiment of the invention, a manufacturing method of a display device includes: providing a substrate; applying an adhesive composition including an ionic surfactant on the substrate to provide a preliminary adhesive layer; applying a voltage to the preliminary adhesive layer; and curing the preliminary adhesive layer to provide an adhesive layer.

In an embodiment, the substrate may include a first area and a second area surrounded by the first area, wherein, in applying the voltage to the preliminary adhesive layer, the voltage may be applied to a portion overlapping the first area in the preliminary adhesive layer.

In an embodiment, in applying the voltage to the preliminary adhesive layer, the ionic surfactant may move to an upper portion of the preliminary adhesive layer in the preliminary adhesive layer overlapping the first area.

In an embodiment, the manufacturing method may further include:

prior to providing the preliminary adhesive layer, disposing an electrode on a bottom of the substrate so as to overlap the first area.

In an embodiment, the adhesive composition may be applied in an inkjet printing manner.

In an embodiment, applying the voltage to the preliminary adhesive layer may be substantially simultaneously performed with curing the preliminary adhesive layer.

In an embodiment, a viscosity of the preliminary adhesive layer at about 25 degrees in Celsius (° C.) may be about 10 centipoises (cP) to about 50 cP.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings:

FIG. 4 is a cross-sectional view of a display device according to an embodiment of the invention;

FIG. 5 is a cross-sectional view of a display panel according to an embodiment of the invention.

DETAILED DESCRIPTION

Figure 1A:
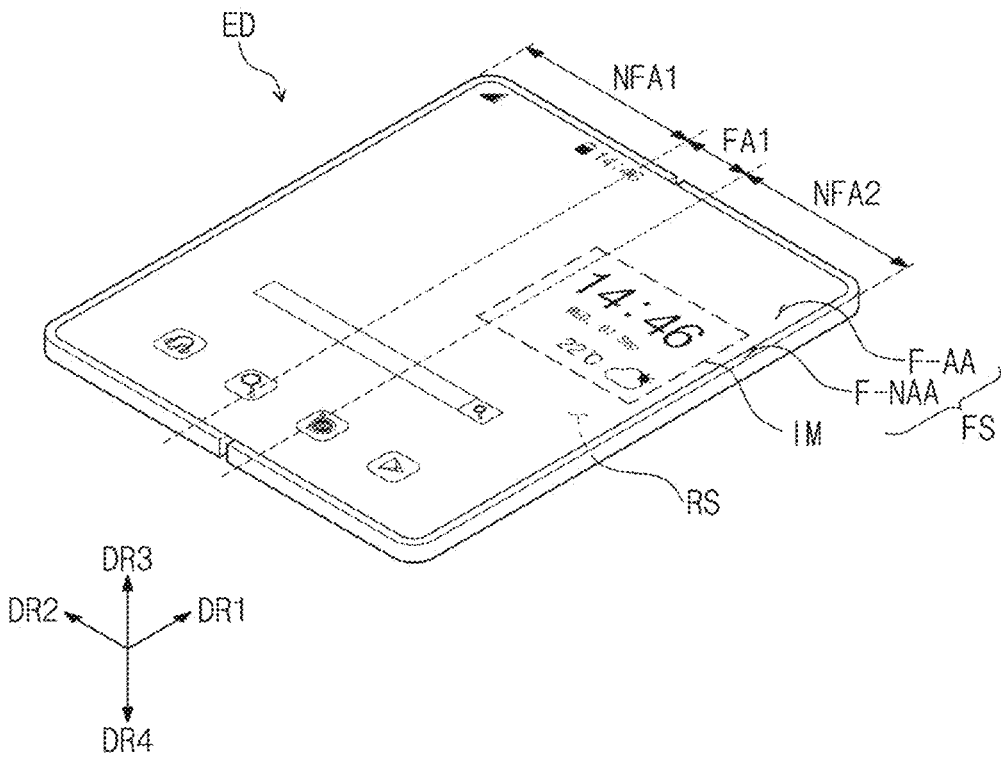
FIG. 1A is a perspective view showing an unfolded state of a display device according to an embodiment of the invention.

Hereinafter, embodiments of the invention will be described in detail with reference to the accompanying drawings.

It will be understood that when an element or layer is referred to as being "on", "connected to" or "coupled to" another element or layer, it can be directly on, connected or coupled to the other element or layer or intervening elements or layers may be present.

Like reference numerals in the drawings refer to like elements. In addition, in the drawings, the thicknesses, ratios and the dimensions of the elements are exaggerated for effective description of the technical details. The term "and/ or" includes all definable combinations of one or more of the associated items.

Terms such as "first", "second", and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure. The singular expressions include plural expressions unless the context clearly dictates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

On the other hand, "being directly disposed" may means that there is not an additional layer, film, region, plate or the like between a part of a layer, film, region, plate or the like and another part. For example, "being directly disposed" may mean that disposition of two layers or two members is performed without using an additional member such as an adhesive member therebetween.

Unless otherwise defined, all terms (including technical and scientific terms) used herein have the same meaning as commonly understood by those skilled in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

"About" "substantially simultaneously" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, a display device according to an embodiment of the invention and a manufacturing method thereof will be described with reference to the drawings.

Figure 1B:
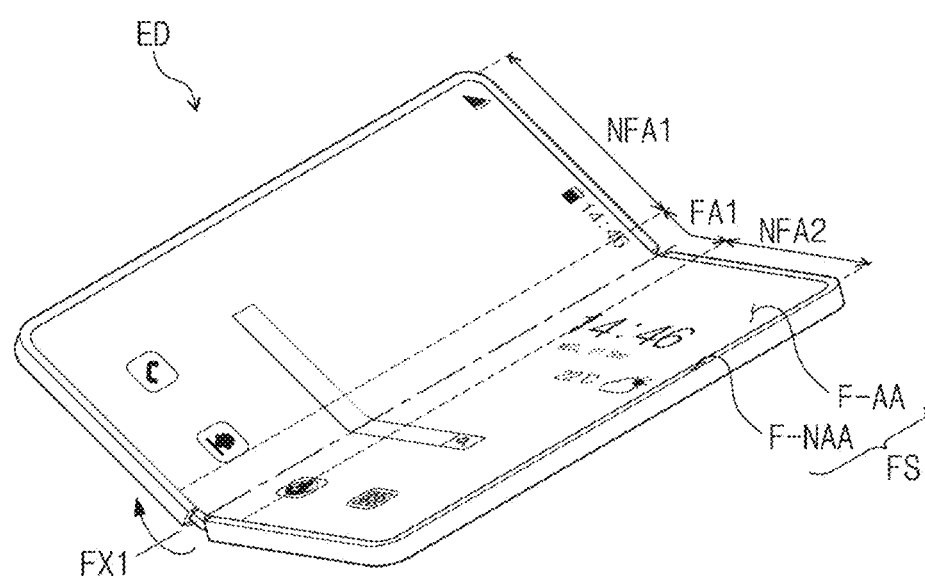
FIG. 1B is a perspective view showing an inner-folding process of a display device according to an embodiment of the invention.
Figure 1B:
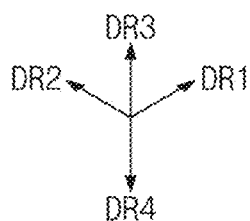
Figure 1C:
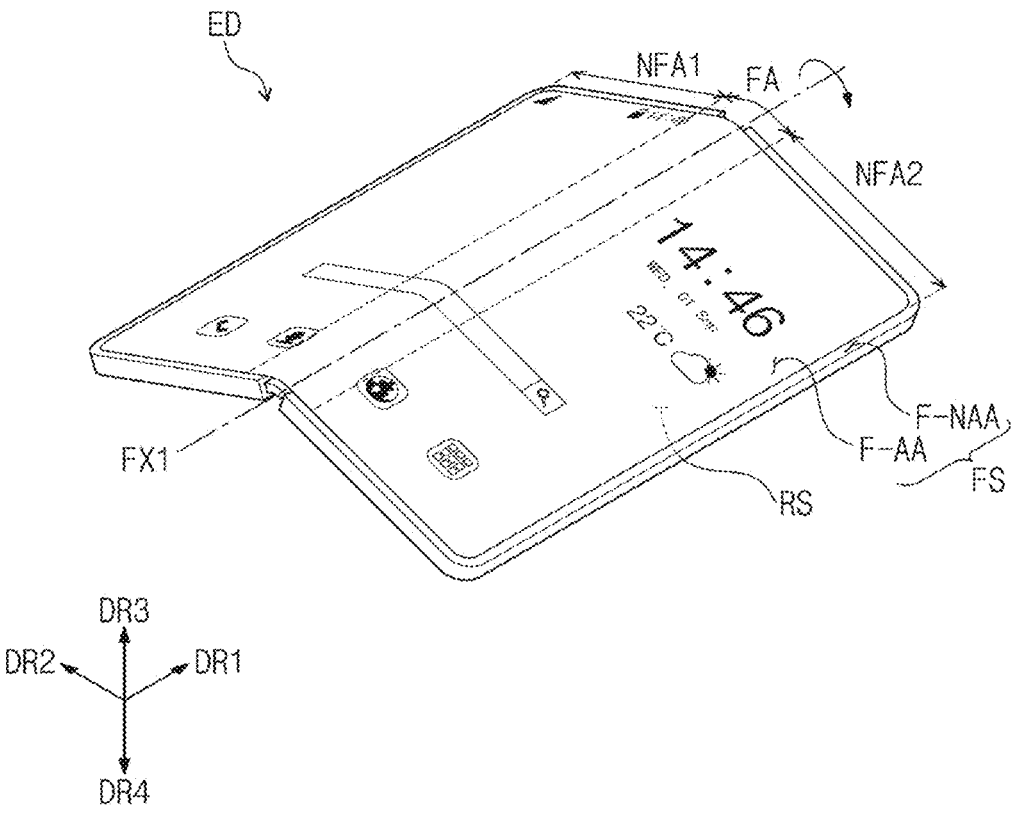
FIG. 1C is a perspective view showing an outer-folding process of a display device according to an embodiment of the invention.

FIG. 1A is a perspective view showing an unfolded state of a display device according to an embodiment. FIG. 1B is a perspective view showing an inner-folding process of the display device shown in FIG. 1A. FIG. 1C is a perspective view showing an outer-folding process of the display device shown in FIG. 1A.

A display device ED according to an embodiment may be a device activated according to an electrical signal. For example, the display device ED may be a mobile phone, a tablet PC, a vehicle navigator, a game device, or a wearable device, but the embodiment of the invention is not limited thereto. An example of the display device ED illustrated in FIG. 1A or the like is a mobile phone.

In FIGS. 1A to 1C, the display device ED is shown as a foldable display device to be deformed in a folded type, but the embodiment of the invention is not limited thereto. The display device ED according to an embodiment may be a flexible display device to be bent or rolled to be deformable in shape.

FIG. 1A and other figures show a first direction DR1 to a fourth direction DR4, and the directions indicated by the first to fourth directions DR1, DR2, DR3, and DR4 described herein may be relative concepts and converted to other directions.

Referring to FIGS. 1A to 1C, the display device ED according to an embodiment may include a display surface FS defined by the first direction DR1 and the second direction DR2 that crosses the first direction DR1. The display device ED may provide a user an image IM through the display surface FS. The display device ED of an embodiment may display the image IM on the display surface FS, which is parallel to the first direction DR1 and the second direction DR2, toward the third direction DR3. In the present specification, on the basis of a direction in which the image IM is displayed, a front surface (or an upper surface) and a rear surface (or a lower surface) of each component are defined. A direction in which the image IM is displayed is taken as the third direction DR3, and the fourth direction DR4 may be defined as a direction opposing the third direction DR3.

The display device ED according to an embodiment may sense an external input applied externally. The external input may include various types of inputs provided from the outside of the display device ED. For example, the external input may include not only a contact with a portion of the body, such as a hand, of the user, but also an external input (e.g., hovering) applied close to or adjacent to the display device ED at a prescribed distance. In addition, the external input may have various types such as force, pressure, temperature, or light, etc.

The display surface FS of the display device ED may include an active area F-AA and a non-active area F-NAA. The active area F-AA may be an area activated according to an electrical signal. The display device ED according to an embodiment may display the image IM through the active area F-AA. In addition, various types of external inputs may be detected in the active area F-AA. The non-active area F-NAA is adjacent to the active area F-AA. The non-active area F-NAA may have a prescribed color. The non-active area F-NAA may surround the active area F-AA. Accordingly, the shape of the active area F-AA may be substantially defined by the non-active area F-NAA. However, this is merely an example. The non-active area F-NAA may be disposed adjacent only to one side of the active area F-AA, or may be omitted. The display device ED according to an embodiment of the invention may include a display area of various shapes, and is not limited to any one embodiment.

Although not shown in the drawings, a sensing area may be included in the active area F-AA. Various electronic modules may be disposed in the sensing area. For example, the electronic module may include at least one among a camera module, a speaker, a light sensing sensor, or a thermal sensing sensor. The electronic modules may sense an external subject through the display surface FS, or provide a sound signal such as a voice to the outside through the display surface FS. The electronic module may also include a plurality of components, and is not limited to any one embodiment.

The rear surface RS of the display device ED of an embodiment may face the display surface FS. The rear surface RS in an embodiment may be an outer surface of the display device ED, and a video or an image may not be displayed thereon. However, the embodiment of the invention is not limited thereto, and the rear surface RS may function as a second display surface on which a video or an image may be displayed. In addition, the display device ED of an embodiment may further include a sensing area disposed in the rear surface RS. A camera, a speaker, or a light sensing sensor or the like may also be disposed in the sensing area disposed on the rear surface RS.

The display device ED may include a folding area FA1 and non-folding areas NFA1 and NFA2. The display device ED may include a plurality of non-folding areas NFA1 and NFA2. The display device ED according to an embodiment may include a first non-folding area NFA1 and a second non-folding area NFA2 disposed with the folding area FA1 interposed therebetween. On the other hand, FIGS. 1A to 1C show an embodiment of the display device ED including one folding area FA1, but the embodiment of the invention is not limited thereto. A plurality of folding areas may be defined in the display device ED. However, the embodiment of the invention is not limited thereto. The display device ED according to an embodiment is folded on the basis of a plurality of folding axes so that portions of the display surface FS face each other, and the number of folding axes and the number of non-folding areas according thereto are not particularly limited.

Referring to FIGS. 1B and 1C, the display device ED according to an embodiment may be folded on the basis of a first folding axis FX1. The first folding axis FX1 shown in FIGS. 1B and 1C is a virtual axis extending in the first direction DR1, and may be parallel to the long side of the display device ED. However, the embodiment of the invention is not limited thereto, and an extension direction of the first folding axis FX1 is not limited to the first direction DR1.

The first folding axis FX1 may extend along the first direction DR1 on the display surface FS, or along the first direction DR1 on the bottom of the rear surface RS. Referring to FIG. 1B, in an embodiment, the first non-folding area NFA1 and the second non-folding area NFA2 may be face each other, and the display device ED may be inner-folded so that the display surface FS is not exposed to the outside. In addition, referring to FIG. 1C, the display device ED according to an embodiment is folded on the basis of the first folding axis FX1 to be deformed in an outer-folded state in which one area overlapping the first non-folding area NFA1 in the rear surface RS faces the other area overlapping the second non-folding area NFA2.

Figure 2A:
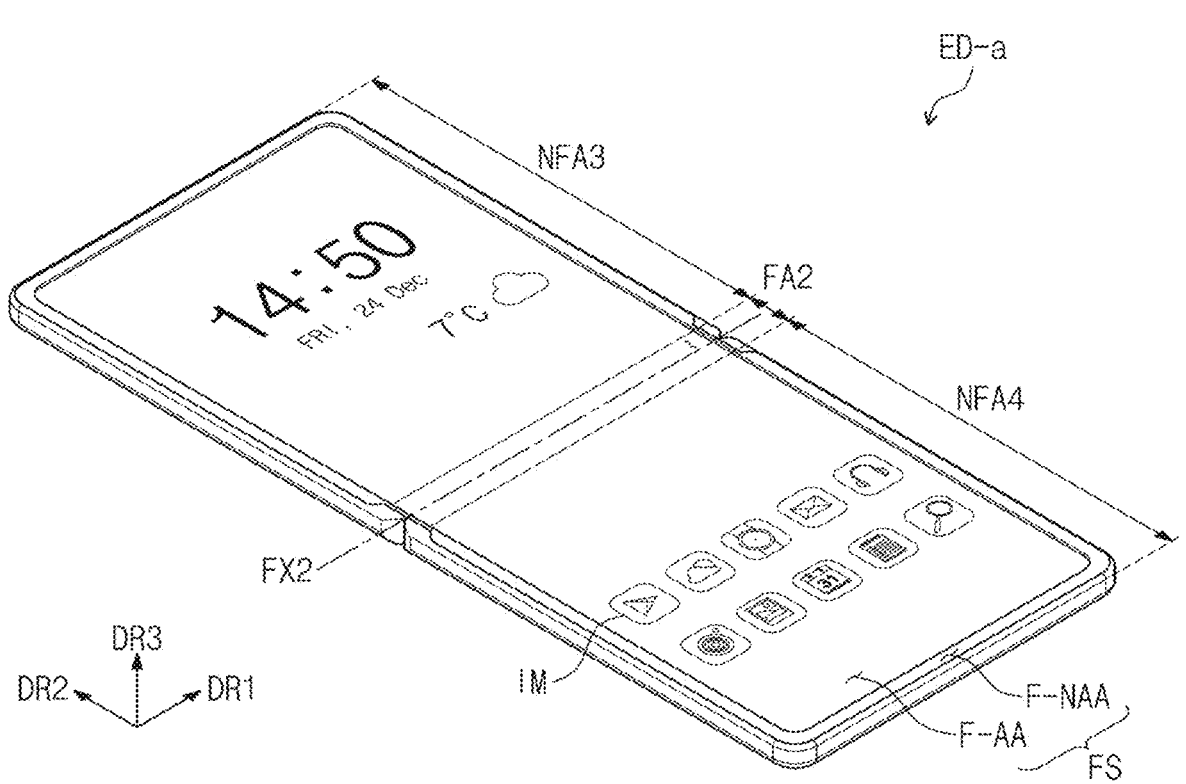
FIG. 2A is a perspective view showing an unfolded state of a display device according to an embodiment of the invention.
Figure 2B:
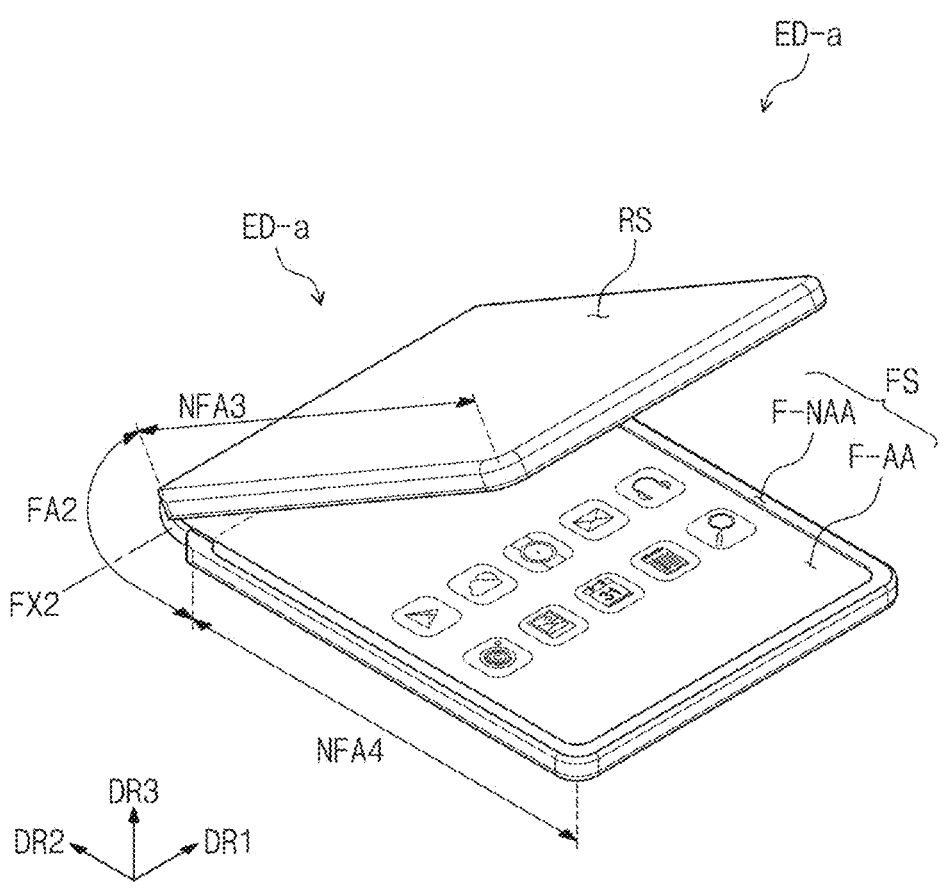
FIG. 2B is a perspective view showing an inner-folding process of the display device shown in FIG. 2A according to an embodiment of the invention.

FIG. 2A is a perspective view showing an unfolded state of a display device according to an embodiment. FIG. 2B is a perspective view showing an inner-folding process of the display device shown in FIG. 2A.

A display device ED-a according to an embodiment may be folded on the basis of a second folding axis FX2 extending in one direction parallel to the first direction DR1. FIG. 2B shows a case where an extension direction of the second folding axis FX2 is parallel to an extension direction of a short side of the display device ED-a. However, the embodiment of the invention is not limited thereto.

The display device ED-a according to an embodiment may include one folding area FA2 and non-folding areas NFA3 and NFA4 adjacent to the folding area FA2. The non-folding areas NFA3 and NFA4 may be disposed to be separated from each other with the folding area FA2 interposed therebetween.

The folding area FA2 has a prescribed curvature and radius of curvature. In an embodiment, the first non-folding area NFA3 and the second non-folding area NFA4 may face each other, and the display device ED-a may be inner-folded so that the display surface FS is not exposed to the outside.

In addition, unlike what is shown, the display device ED-a in an embodiment may be outer-folded so that the display surface FS is exposed to the outside. A first display surface FS in an embodiment is visible to a user in a state where the display device ED-a is non-folded, and a second display surface RS is visible to the user, in a state where the display device ED-a is inner-folded. The second display surface RS may include an electronic module area in which an electronic module including various components is disposed.

The display device ED-a according to an embodiment may include the second display surface RS, and the second display surface RS may be defined as a surface opposite to at least a portion of the first display surface FS. In the inner-folded state, the second display surface RS is visible to the user. The second display surface RS may include an electronic module area in which an electronic module including various components is disposed. In an embodiment, an image may be provided through the second displays surface RS.

In an embodiment, the display devices ED and ED-a may be configured so that an inner-folding or outer-folding operation is mutually repeated from an unfolding operation, but the embodiment of the invention is not limited thereto. In an embodiment, the display devices ED and ED-a may be configured to select any one among the unfolding operation, the inner-folding operation, and the outer-folding operation.

In FIGS. 1A to 2B, the display devices ED and ED-a are shown as a foldable display device to be deformed in a folded type, but the embodiment of the invention is not limited thereto. The display device ED of an embodiment may be a flexible display device to be bent or rolled to be deformable in shape.

Figure 3:
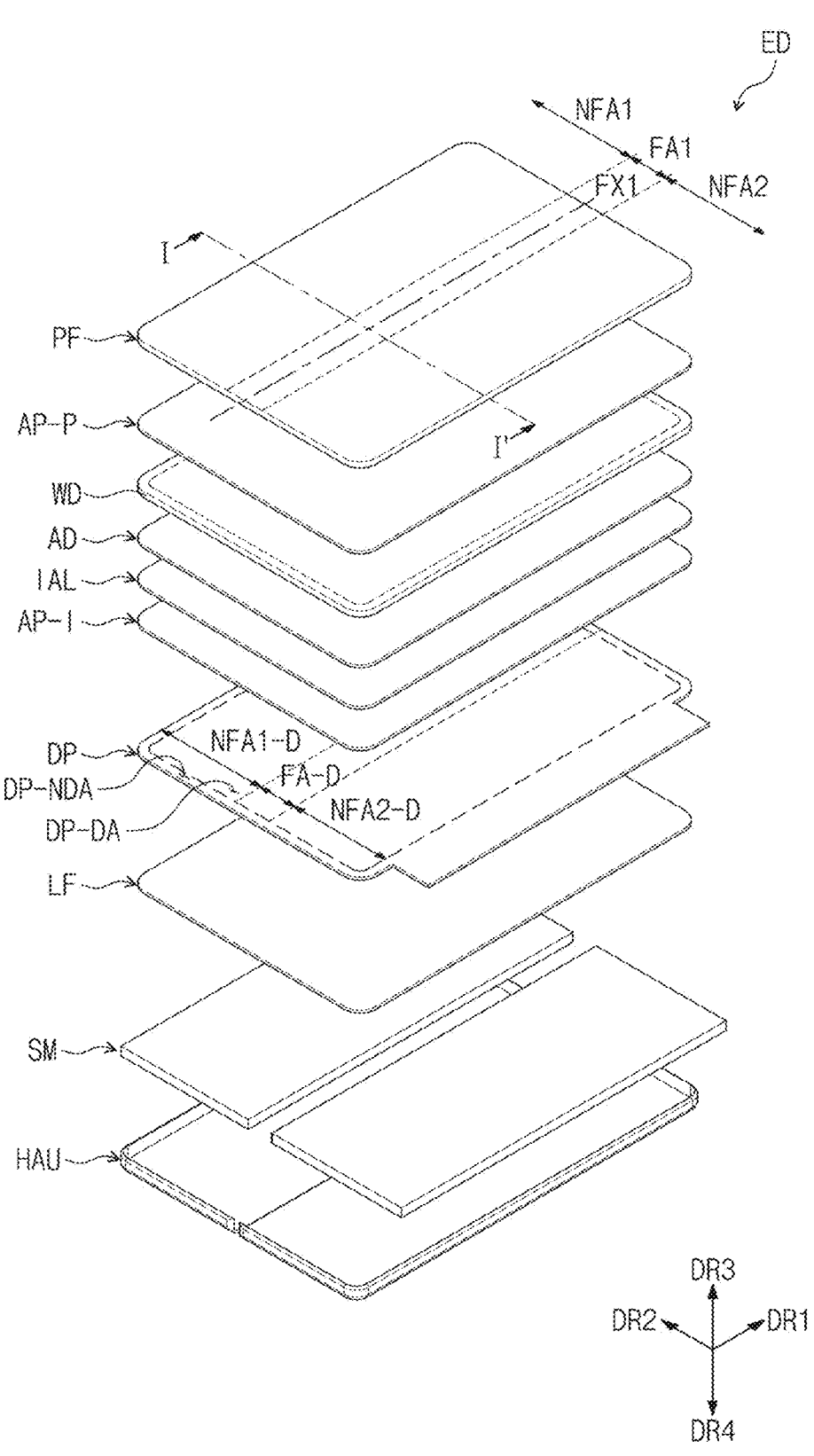
FIG. 3 is an exploded perspective view of a display device according to an embodiment of the invention.
Figure 4:
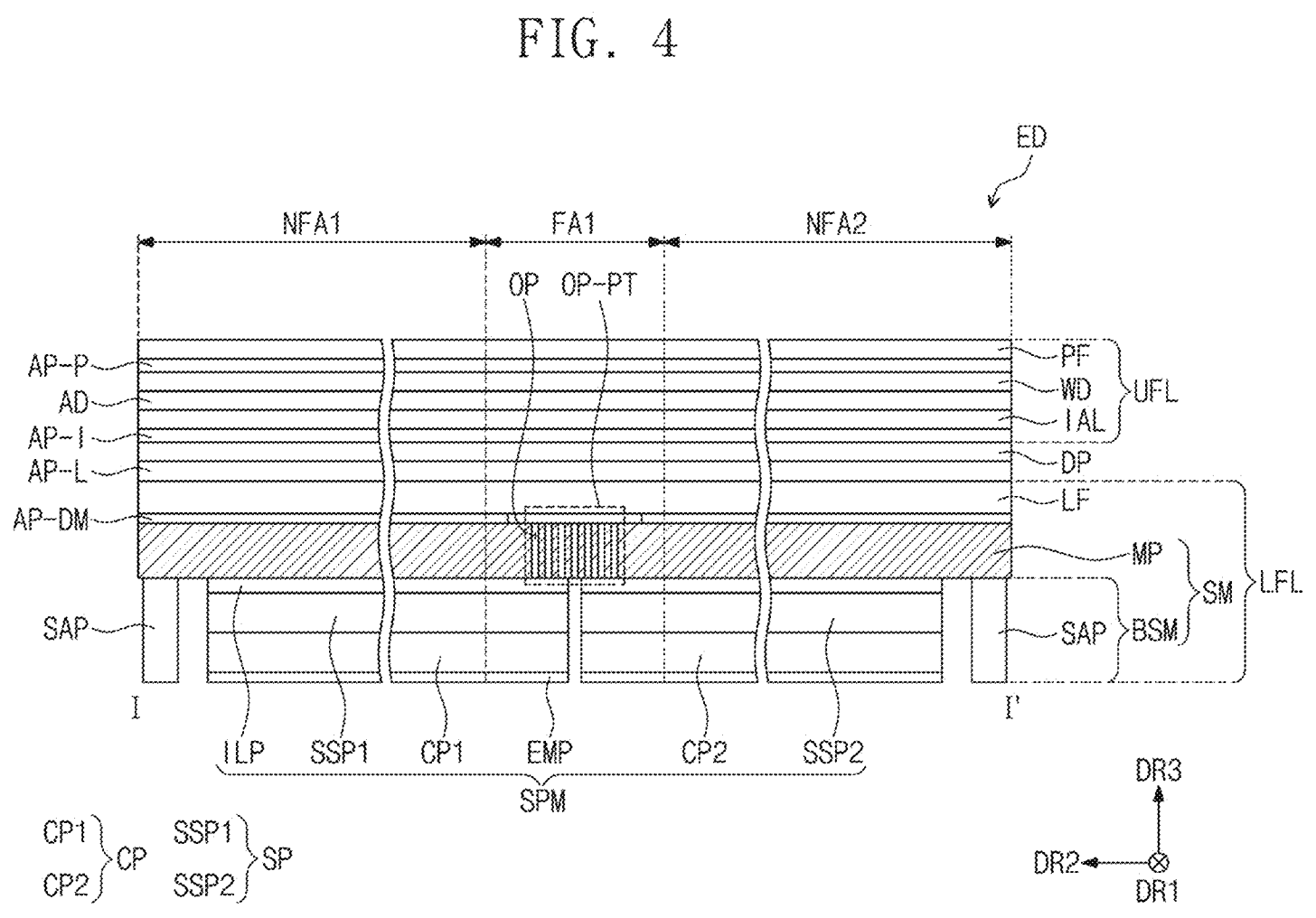
Figure 5:
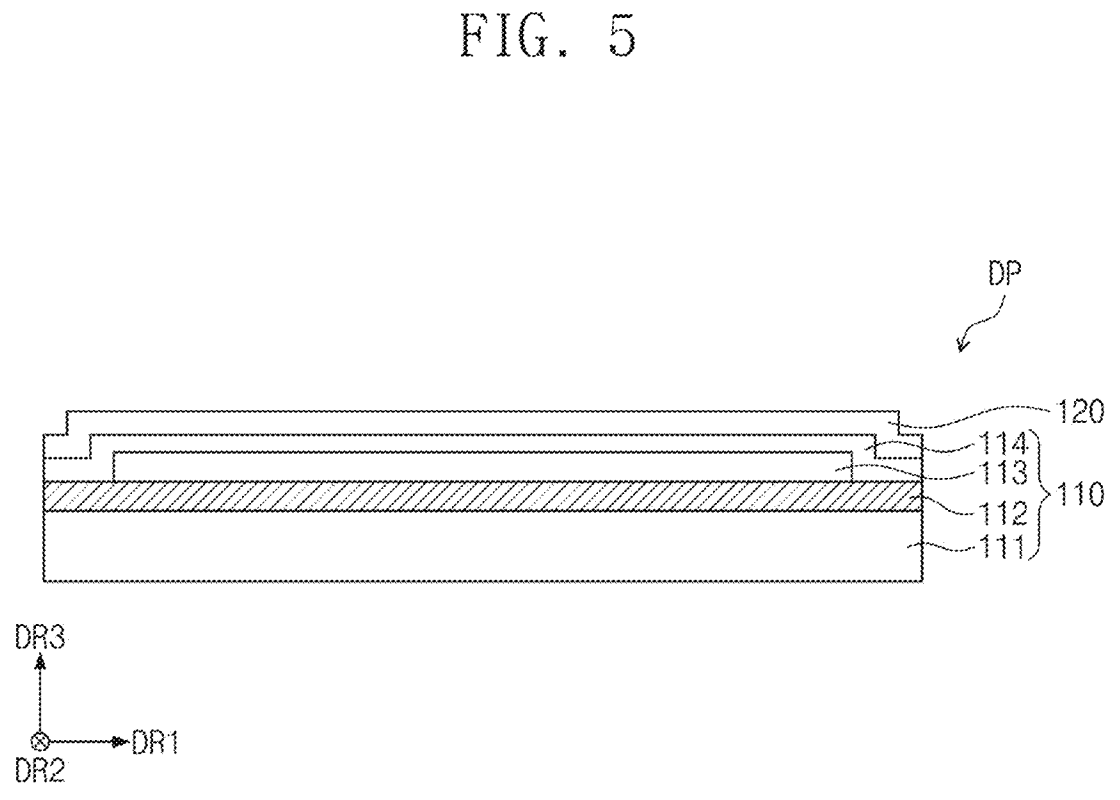

FIG. 3 is an exploded perspective view of a display device according to an embodiment, and FIG. 4 is a cross-sectional view of a display device according to an embodiment. FIG. 5 is a cross-sectional view of a display panel according to an embodiment. FIG. 3 shows an example of an exploded perspective view of a display device according to an embodiment shown in FIG. 1A. FIG. 4 is a cross-sectional view showing a portion corresponding to a line I-I' of FIG. 3.

Referring to FIGS. 3 and 4, the display device ED according to an embodiment may include a display panel DP, and upper functional layers UFL disposed on an upper side of the display panel DP. In addition, the display device ED according to an embodiment may include lower functional layers LFL disposed in a lower side of the display panel DP. In FIGS. 3 and 4, the display device ED shown in FIGS. 1A to 1C is described as an embodiment, but the details described below may be equally applied to the display device ED-a shown in FIGS. 2A and 2B.

A window WD may cover the entire outer side of the display module DM. The window WD may have the shape corresponding to that of the display panel DP. In addition, the display device ED of an embodiment may include a housing HAU accommodating the display panel DP and a support module SM. The housing HAU may be combined with the window WD. Although not shown in the drawing, the housing HAU may further include a hinge structure for facilitating folding or bending.

The display panel DP in the display device ED of an embodiment may display an image according to an electrical signal, and transmit and receive information about an external input. The display panel DP may be defined with a display area DP-DA and a non-display area DP-NDA. The display area DP-DA may be defined as an area into which an image provided from the display panel DP is emitted.

The non-display area DP-NDA may be adjacent to the display area DP-DA. For example, the non-display area DP-NDA may surround the display DP-DA. However, this is merely an example, and the non-active area DP-NDA may be defined with various shapes and is not limited to any one embodiment. According to an embodiment, the display area DP-DA of the display panel DP may correspond to at least a portion of the active area F-AA (see FIG. 1A).

The display panel DP in the display device ED according to an embodiment may include a folding display unit FA-D and non-folding units NFA1-D and NFA2-D. The folding display unit FA-D is a portion corresponding to the folding area FA1 in FIG. 1A, and the non-folding areas NFA1-D and NFA2-D may be portions corresponding to the non-folding areas NFA1 and NFA2 (see FIG. 1A).

Referring to FIG. 5, the display panel DP may be a component configured to generate an image, and sense an input applied externally. For example, the display panel DP may include a display layer 110 and a sensor layer 120. The thickness of the display panel DP may be about 25 micrometers ($\mu$m) to about 35 $\mu$m, for example, about 30 $\mu$m, but is not limited thereto.

The display layer 110 may be a component configured to substantially generate an image. The display layer 110 may be a light emitting display layer, for example, an organic light emitting display layer, a quantum dot display layer, or a micro LED display layer.

The display layer 110 may include a base layer 111, a circuit layer 112, a light emitting element layer 113, and an encapsulation layer 114.

The base layer 111 may include a synthetic resin film. The synthetic resin layer may include a thermosetting resin. The base layer 111 may have a multi-layer structure. For example, the base layer 111 may have a three-layer structure of a synthetic resin layer, an adhesive layer, and a synthetic resin layer. In particular, the synthetic resin layer may be a polyimide-based resin layer, but a material thereof is not particularly limited. The synthetic resin layer may include at least one among an acrylic-based resin, a meta-acrylic-based resin, a polyisoprene-based resin, a vinyl-based resin, an epoxy-based resin, a urethane-based resin, a cellulose-based resin, a siloxane-based resin, a polyamide-based resin, or a parylene-based resin. In addition, the base layer 111 may include a glass substrate, an organic/inorganic composite material substrate or the like.

The circuit layer 112 may be disposed on the base layer 111. The circuit layer 112 may include an insulation layer, a semiconductor pattern, a conductive pattern, a signal line, and the like. The insulation layer, the semiconductor layer, and the conductive layer are defined on the base layer 111 in a manner of coating, deposition, or the like, and then, the insulation layer, the semiconductor layer, and the conductive layer may be selectively patterned through a plurality of times of a photolithography process. Thereafter, the semiconductor pattern, the conductive pattern, and the signal line included in the circuit layer may be defined.

The light emitting element layer 113 may be disposed on the circuit layer 112. The light emitting element layer 113 may include a light emitting element. For example, the light emitting element layer 113 may include an organic light emitting matter, a quantum dot, a quantum rod, or a micro LED.

The encapsulation layer 114 may be disposed on the light emitting element layer 113. The encapsulation layer 114 may include an inorganic layer, an organic layer, and an inorganic layer that are sequentially laminated, but the layers constituting the encapsulation layer 114 are not limited thereto.

The inorganic layers may protect the light emitting element layer 113 from moisture and oxygen, and the organic layer may protect the light emitting element layer 113 from a foreign matter such as a dust particle. The inorganic layers may include a silicon nitride layer, a silicon oxynitride layer, a silicon oxide layer, a titanium oxide layer, an aluminum oxide layer or the like. The organic layer may include an acrylic-based organic layer, but is not limited thereto.

The sensor layer 120 may be disposed on the display layer 110. The sensor layer 120 may sense an external input applied from the outside. The external input may be a user input. The user input may include various types of external inputs including a part of the user's body, light, heat, a pen, pressure or the like.

The sensor layer 120 may be disposed on the display layer 110 through a continuous process. In this case, the sensor layer 120 may be expressed to be directly disposed on the display layer 110. To be directly disposed may mean that a third element is not disposed between the sensor layer 120 and the display layer 110. In other words, a separate adhesive member may not be disposed between the sensor layer 120 and the display layer 110.

Alternatively, the sensor layer 120 may be combined with the display layer 110 through an adhesive member. The adhesive member may include a typical adhesive or a pressure sensitive adhesive.

Referring to FIG. 4 again, the window WD is disposed on the display panel DP. The window WD may include an optically transparent insulation matter. The window WD may protect the display panel DP. In other words, the window WD may be a cover window configured to cover the top portion of the display panel DP.

An image IM (see FIG. 1A) generated by the display panel DP may penetrate through the window WD to be provided to the user. The window WD may provide a touch surface of the display device ED. The window WD in the display device ED including the folding area FA1 may be a foldable flexible window.

The adhesive layer AD may be disposed on the display panel DP. The adhesive layer AD may combine at least two components among the components included in the display panel DP and the upper functional layers. For example, the adhesive layer AD may combine the window WD and an upper protection film IAL, or the window and the protection layer PF. The adhesive layer AD according to an embodiment may include the ionic surfactant ISF (see FIG. 6B). The ionic surfactant ISF (see FIG. 6B) in the present specification may include a positive ionic surfactant or a negative ionic surfactant. The adhesive layer will be described below in detail. FIGS. 3 and 4 show the adhesive layer AD as being interposed between the window WD and the upper protection film IAL, but this is an example and the embodiment of the invention is not limited thereto.

In the display device ED of an embodiment, the upper functional layers UFL may include a plurality of adhesive layers. The upper functional layers UFL of the display device ED of an embodiment may include additional adhesive layers other than the adhesive layer AD of the embodiment. For example, the display device of the embodiment may include a first upper adhesive layer AP-P and a second upper adhesive layer AP-I. The first upper adhesive layer AP-P may be interposed between the protection layer PF and the window WD. The window WD and the protection layer PF may be adhered by the first upper adhesive layer AP-P. The second upper adhesive layer AP-I may be interposed between the upper protection film IAL and the display panel DP. The upper protection film IAL and the display layer DP may be adhered by the second upper adhesive layer AP-I.

The first upper adhesive layer AP-P and the second upper adhesive layer AP-I may include typical adhesives or pressure adhesives. Each of the first upper adhesive layer AP-P and the second upper adhesive layer AP-I may be an optically clear adhesive ("OCA") film or an optically clear adhesive resin ("OCR") layer.

The protection layer PF may be disposed on the window WD. The protection layer PF may be a function layer configured to protect the top surface of the window WD.

The protection layer PF according to an embodiment may include at least one polymer resin among Polyethyleneterephthalte ("PET"), Polybutylene terephthalate ("PBT"), Polyethylene Naphthalene ("PEN"), Polycarbonate ("PC"), Poly methylmethacrylate ("PMMA"), Polystyrene, ("PS"), Polyvinylchloride ("PVC"), Polyethersulfone ("PES"), Polypropylene ("PP"), Polyamide ("PA"), modified polyphenylene ether ("m-PPO"), Polyoxymethylene ("POM"), Polysulfone ("PSU"), Polyphenylene sulfide ("PPS"), Polyimide ("PI"), Polyethyleneimine ("PEI"), Polyether ether ketone ("PEEK"), Polyamide imide ("PAI"), Polyarylate ("PAR"), or Thermoplastic polyurethane, ("TPU"). The protection layer PF may be a polymer film layer. For example, the protection layer PF in an embodiment may be a PET film or a TPU film.

The protection layer PF may further include a material such as an anti-fingerprint coating agent, an anti-static agent, a hard coating agent or the like to play a role of a functional layer. The protection layer PF may have a multi-layered laminate structure, and further include an anti-fingerprint coating layer, an anti-static coating layer, a hard coating layer or the like as a separate functional layer.

Lower functional layers LFL may be disposed under the display panel DP. For example, the lower functional layers LFL may include a lower film LF and a support module SM. The support module SM may include a support plate MP and a bottom support member BSM. The components included in the lower functional layers LFL may not be limited to the foregoing components. At least a portion of the foregoing components may be omitted, or other components may be added.

The display device ED according to an embodiment may include a lower film LF disposed on the bottom of the display panel DP. The lower film LF may be disposed under the display panel DP to protect the bottom of the display panel DP. The display device ED of an embodiment may include a lower adhesive layer AP-L combining the display panel DP and the lower film LF.

The lower film LF may be a polymer film. For example, the lower film LF may include a PET film or a PI film. The lower film LF may prevent the rear surface of the display panel DP from being scratched in a display panel manufacturing process. In addition, the lower film LF may block the display panel DP from being deformed by protecting the display panel DP against a pressure applied from the outside. The lower film LF may have one film layer or a structure in which a plurality of film layers is laminated.

The lower adhesive layer AP-L may be disposed between the display panel DP and the lower film LF. The lower adhesive layer AP-L may be an OCA film or an OCR layer. However, the embodiment of the invention is not limited thereto, and the lower adhesive layer AP-L may include an acrylic-based adhesive, a silicone-based adhesive, or the like. In addition, the lower adhesive layer AP-L in an embodiment may be omitted.

The display device ED according to an embodiment may include the support module SM disposed on the bottom of the display panel DP. The support module SM may include a support plate MP and a bottom support member BSM.

The support plate MP may be disposed in a lower side of the display panel DP. The support plate MP in an embodiment may include a metal material or a polymer material. For example, the support plate MP may be defined by including stainless steel, aluminum, or an alloy thereof. Unlike this, the support plate MP may be defined from Carbon Fiber Reinforced Plastic ("CFRP") or the like. However, the embodiment of the invention is not limited thereto, and the support plate MP may include a non-metallic material, plastics, fiber reinforced plastics, glass or the like.

A plurality of openings OP may be defined in the support plate MP. The support plate MP may include an opening pattern OP-PT including the plurality of openings OP. The opening pattern OP-PT may correspond to the folding area FA1.

The bottom support member BSM may include a support member SPM and a charging unit SAP. The support member SPM may be a part overlapping the most area of the display panel DP. The charging unit SAP may be a part disposed in the outside of the support member SPM to overlap a peripheral area of the display panel DP.

The bottom support member BSM may include at least one among a support layer SP, a cushion layer CP, a shielding layer EMP, or an interlayer adhesive layer ILP. On the other hand, the configuration of the bottom support member BSM is not limited to what is shown in FIG. 4, and may be differed according to the size and shape of the display device ED, or the operation characteristics of the display device ED. For example, some of the support layer SP, the cushion layer CP, the shield layer EMP, and the interlayer adhesive layer ILP may be omitted, and a laminate sequence of them may be changed to a sequence different from what is shown in FIG. 4, or additional components other than the shown components may be further included. For example, the bottom support member BSM may further include a digitizer or the like.

The support layer SP may include a metal material or a polymer material. The support layer SP may be disposed under the support plate MP. For example, the support layer SP may be a thin film metal substrate.

The support layer SP may include a first sub-support layer SSP1 and a second sub-support layer SSP2 that are separate from each other in the second direction DR2. The first sub-support layer SSP1 and the second sub-support layer SSP2 may be separate from each other on the basis of a portion corresponding to the folding axis FX1. The support layer SP may be provided as the sub-support layer SSP1 and the second sub-support layer SSP2, which are separate from each other in the folding area FA1, to improve folding or bending characteristics of the display device ED.

The cushion layer CP may be disposed under the support layer SP. The cushion layer CP may prevent a pressing phenomenon or plastic deformation of the support plate MP caused by an external shock or force. The cushion layer CP may improve impact resistance of the display device ED. The cushion layer CP may include an elastomer or the like such as sponge, foam, or a urethane resin. In addition, the cushion layer CP may be defined from at least one among an acrylic polymer, a urethane-based polymer, a silicone-based polymer, or an imide-based polymer. However, the embodiment of the invention is not limited thereto.

In addition, the cushion layer CP may include a first sub-cushion layer CP1 and a second sub-cushion layer CP2 that are separate from each other in the second direction DR2. The first sub-cushion layer CP1 and the second sub-cushion layer CP2 may be separate from each other in a portion corresponding to the folding axis FX1. The cushion layer CP may be provided as the sub-cushion layer CP1 and the second sub-cushion layer CP2, which are separate from each other in the folding area FA1, to improve folding or bending characteristics of the display device ED.

The shielding layer EMP may be an electromagnetic wave shielding layer or a heat dissipation layer. In addition, the shielding layer may function as an adhesive layer. The interlayer adhesive layer ILP may allow the support plate MP to adhere to the bottom support member BSM. The interlayer adhesive layer ILP may be provided in a type of an adhesive resin layer or an adhesive tape. In FIG. 3, the interlayer adhesive layer ILP is shown to be divided into two parts separate from each other in a portion corresponding to the folding area FA1, but the embodiment of the invention is not limited thereto. The interlayer adhesive layer ILP may be provided as one layer that is not separate in the folding area FA1.

The charging unit SAP may be disposed in the peripheral area of the support layer SP and the cushion layer CP. The charging unit SAP may be disposed between the support plate MP and the housing HAU. The charging unit SAP may fill the space between the support plate MP and the housing HAU, and fix the support plate MP.

In addition, the display device ED of an embodiment may further include a module adhesive layer AP-DM between the display module DM and the support module SM. The module adhesive layer AP-DM may be a PCA film or an OCR layer. Although not shown, an adhesive layer may be further included between members included in the support module SM.

Figure 6A:
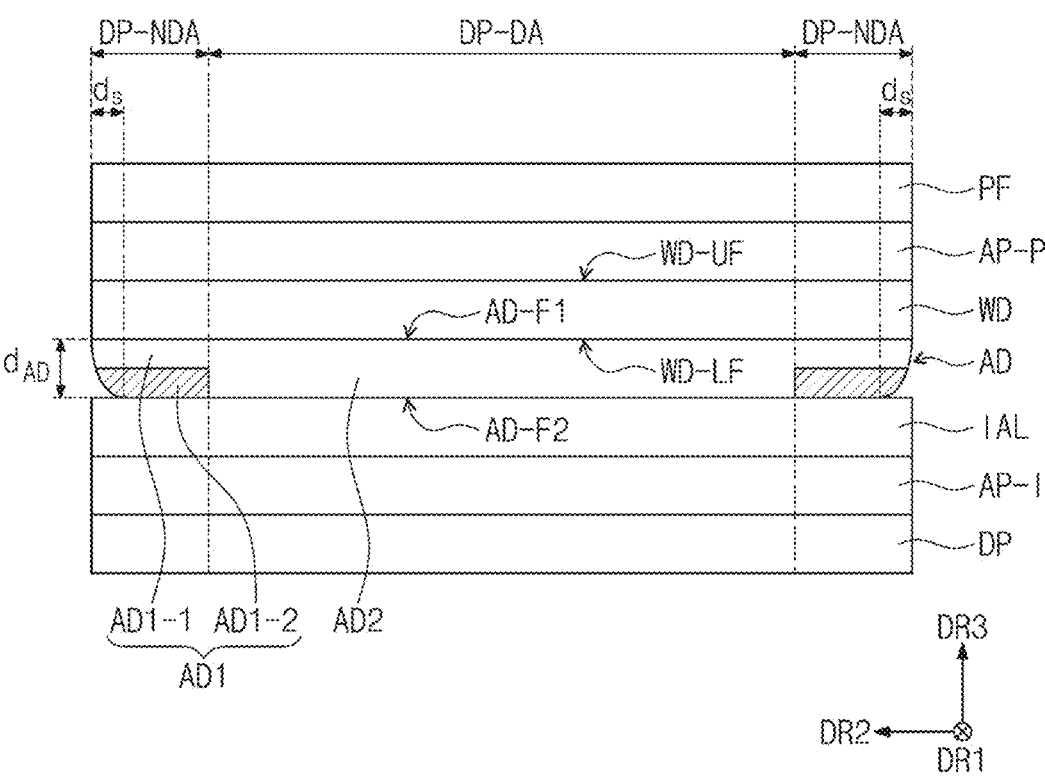
FIG. 6A is a cross-sectional view of a partial configuration of a display device according to an embodiment of the invention.
Figure 6B:
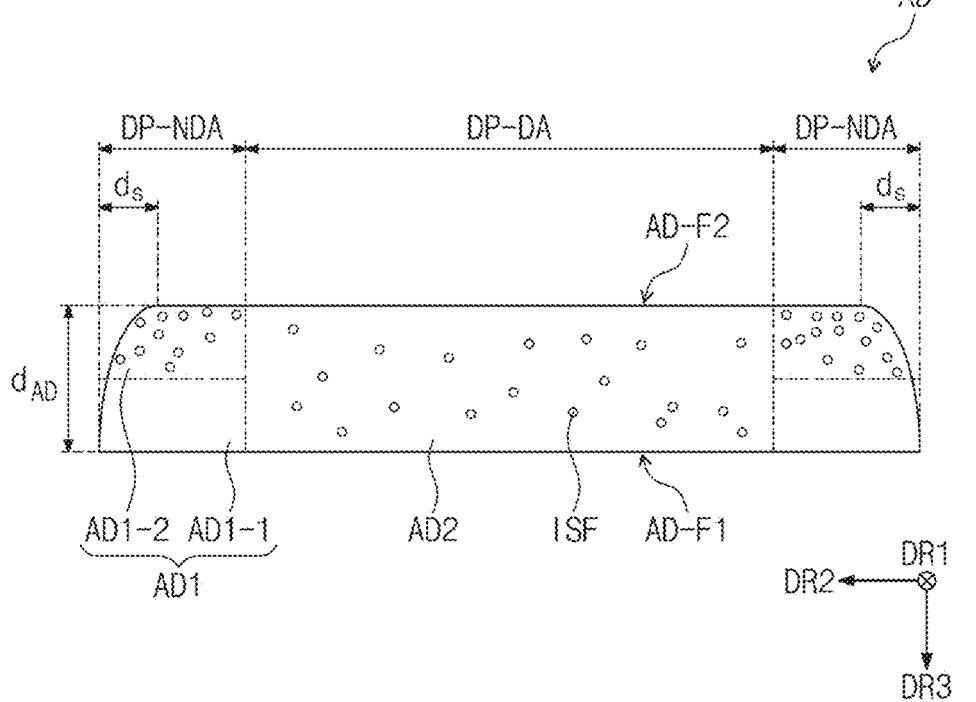
FIG. 6B is a cross-sectional view of an adhesive layer according to an embodiment of the invention.

FIG. 6A is a cross-sectional view of a partial configuration of a display device according to an embodiment. FIG. 6B is a cross-sectional view of an adhesive layer according to an embodiment. Here, the lower functional layers LFL of the display device ED shown in FIGS. 3 and 4 are omitted in FIG. 6A for convenience of explanation.

Referring FIG. 6A, the window WD may include an upper surface WD-UF, and a lower surface WD-LF facing the upper surface WD-UF. The upper surface WD-UF of the window WD may be adjacent to the protection layer PF, and the lower surface WD-LF of the window WD may be adjacent to the display panel DP. The lower surface WD-LF of the window WD may face the upper surface WD-UF of the window WD in the third direction DR3.

The adhesive layer AD may include a first surface AD-F1 and a second surface AD-F2 facing the first surface AD-F1 in the third direction DR3. In an embodiment, the first surface AD-F1 of the adhesive layer AD may be disposed adjacent to the window WD. The first surface AD-F1 of the adhesive layer AD may contact the lower surface WD-LF of the window WD.

Referring to FIGS. 6A and 6B, the adhesive layer AD of an embodiment may include ionic surfactant ISF. The ionic surfactant ISF may include a positive ionic surfactant or a negative ionic surfactant. Although the ionic surfactant ISF in FIG. 6B is illustrated as a particle of which cross-section is a circle, but it is an example for convenience of explanation and does not limit a substantial shape of the ionic surfactant ISF.

In an embodiment, a concentration distribution of the ionic surfactant ISF may vary in a portion of the adhesive layer AD. In the portion of the adhesive layer AD, the concentration of the ionic surfactant ISF may increase in a direction from the first surface AD-F1 toward the second surface AD-F2. In other words, in the adhesive layer AD, the concentration of the ionic surfactant ISF may increase from the first surface AD-F1 in a direction away from the window WD.

The adhesive layer AD of an embodiment may include a first portion AD1 and a second portion AD2. The first portion AD1 and the second portion AD2 in the adhesive layer AD may be divided according to the concentration distribution of the ionic surfactant ISF.

The first portion AD1 of the adhesive layer AD may be a portion in which the concentration of the ionic surfactant ISF may increase in a direction from the first surface AD-F1 to the second surface AD-F2. In other words, the first portion AD1 of the adhesive layer AD may have a concentration distribution of the ionic surfactant ISF increasing in a direction from the first surface AD-F1 toward the second surface AD-F2. In an embodiment, the concentration distribution of the ionic surfactant ISF in the first portion AD1 may increase in a direction away from the window WD.

The second portion AD2 of the adhesive layer AD may be a portion in which the concentration of the ionic surfactant ISF is constant in the third direction DR3 that is a thickness direction of the adhesive layer AD. In other words, in the second portion AD2, a concentration distribution of the ionic surfactant ISF is uniform in a direction from the first surface AD-F1 toward the second surface AD-F2.

Referring to FIG. 6A, the first portion AD1 of the adhesive layer AD may overlap the non-display area DP-NDA, and the second portion AD2 of the adhesive layer AD may overlap the display area DP-DA in the thickness direction. In other words, the first portion AD1 of the adhesive layer AD may be provided by overlapping the non-display area DP-NDA, and the second portion AD2 of the adhesive layer AD may be provided by overlapping the display area DP-DA. FIG. 6A illustrates the adhesive layer AD as overlapping the entirety of the non-display area DP-NDA, but the embodiment of the invention is not limited thereto. In another embodiment, for example, unlike what is shown in FIG. 6A, the adhesive layer AD may overlap only a part of the non-display area DP-NDA.

In the adhesive layer AD of an embodiment, the first portion AD1 may be provided by overlapping the non-display area DP-NDA. The first portion AD1 of the adhesive layer AD may be a portion to which a voltage is applied in a step for applying the voltage to a preliminary adhesive layer P-AD (see FIG. 10D) in a manufacturing method of a display device according to an embodiment to be described below. The second portion AD2 in the adhesive layer AD of an embodiment may be provided by overlapping the display area DP-DA in the thickness direction. The second portion AD2 of the adhesive layer AD may be a portion to which the voltage is not applied in the step for applying the voltage to a preliminary adhesive layer P-AD (see FIG. 10D) in the manufacturing method of a display device according to the embodiment to be described below.

In an embodiment, the first portion AD1 of the adhesive layer AD may include a first sub-adhesive unit AD1-1 and a second sub-adhesive unit AD1-2. The first sub-adhesive unit AD1-1 may include the first surface AD-F1 of the adhesive layer AD, and the second sub-adhesive unit AD1-2 may include the second surface AD-F2 of the adhesive layer AD. The first sub-adhesive unit AD1-1 may be disposed adjacent to the window WD, and the second sub-adhesive unit AD1-2 may be disposed adjacent to the display panel DP. The second sub-adhesive unit AD1-2 may be provided to have a prescribed thickness in the third direction DR3, which is a thickness direction, from the second surface AD-F2 of the adhesive layer AD.

A concentration value of the ionic surfactant ISF in the adhesive layer AD of an embodiment may decrease in a direction toward the first sub-adhesive unit AD1-1 from the second sub-adhesive unit AD1-2 of the first portion AD1. The concentration of the ionic surfactant ISF in the second sub-adhesive unit AD1-2 may be larger than the concentration of the ionic surfactant ISF in the first sub-adhesive unit AD1-1. In other words, the number of ionic surfactants ISF included in the second sub-adhesive unit AD1-2 of the first portion AD1 per unit volume may be greater than the number of ionic surfactants ISF included in the first sub-adhesive unit AD1-1 of the first portion AD1 per unit volume. The concentration of the ionic surfactant ISF included in the second sub-adhesive unit AD1-2 of the first portion AD1 may be about 50% to about 95% of the entire concentration of the ionic surfactant included in the first portion AD1.

In an embodiment, the first sub-adhesive unit AD1-1 may not include the ionic surfactant ISF. In this case, the second sub-adhesive unit AD1-2 may indicate a portion to a point at which the concentration of the ionic surfactant ISF (see FIG. 6) decreases to 0 in a direction from the second surface AD-F2 of the adhesive layer AD toward the first surface AD-F1. However, the embodiment of the invention is not limited thereto.

The ionic surfactant ISF included in the second sub-adhesive unit AD1-2 may have a first concentration. The ionic surfactant ISF included in the first sub-adhesive unit AD1-1 may have a second concentration. The ionic surfactant ISF included in the second portion AD2 may have a third concentration. The first concentration of the ionic surfactant ISF in the second sub-adhesive unit AD1-2 may be greater than the second concentration of the ionic surfactant ISF in the first sub-adhesive unit AD1-1, and greater than the third concentration of the ionic surfactant ISF in the second portion AD2 of the adhesive layer AD. In an embodiment, the concentrations of the ionic surfactant ISF in the second portion AD2, the first sub-adhesive unit AD1-1, and the second sub-adhesive unit AD1-2 may satisfy Equation (1).

$$D_{AD1\text{-}2} > D_{AD2} \geq D_{AD1\text{-}1} \tag{1}$$

where $D_{AD1\text{-}2}$ denotes the first concentration of the ionic surfactant ISF in the second sub-adhesive unit AD1-2, $D_{AD1\text{-}1}$ denotes the second concentration of the ionic surfactant ISF in the first sub-adhesive unit AD1-1, and $D_{AD2}$ denotes the third concentration of the ionic surfactant ISF in the second portion AD2. Referring to Equation (1), the first concentration may be greater than each of the second concentration and the third concentration. The third concentration may be equal to or greater than the second concentration.

In an embodiment, the thickness $d_{AD}$ of the adhesive layer AD in the third direction DR3 may be about 35 μm to about 75 μm. For example, the thickness $d_{AD}$ of the adhesive layer AD may be about 40 μm to about 70 μm. When the thickness $d_{AD}$ of the adhesive layer AD is smaller than about 35 μm, the adhesive layer may not have a sufficient adhesive strength. When the thickness $d_{AD}$ of the adhesive layer AD is greater than about 75 μm, the adhesive layer AD is thick and thus the folding characteristics or bending characteristics of a flexible display device may be lowered. When the thickness $d_{AD}$ of the adhesive layer AD satisfies the foregoing range, the adhesive layer AD may show a sufficient adhesive strength and excellent durability against bending deformation to be suitable to a foldable display device or a bending display device.

In an embodiment, the ionic surfactant ISF may include at least one among dodecyl trimethyl ammonium bromide, cetyltrimethyl ammonium bromide, tetradecyltrimethylammonium bromide, sodium dodecyl sulfate, or the like.

In an embodiment, a weight ratio of the ionic surfactant ISF relative to the entire weight of the adhesive layer AD in the adhesive layer AD may be about 1 percentages by weight (wt %) to about 10 wt %. When the weight ratio of the ionic surfactant ISF is smaller than about 1 wt %, dewetting characteristics may not be sufficiently expressed when a voltage is applied to the adhesive layer AD, and when the weight ratio of the ionic surfactant ISF is greater than about 10 wt %, an aggregation phenomenon of the ionic surfactant ISF may appear in the adhesive layer AD.

The adhesive layer AD has a flat top surface in the second portion AD2, and, in the first portion AD1, the thickness may become gradually thinner toward the edge in the third direction DR3. In other words, the first portion AD1 of the adhesive layer AD may include inclined side surfaces. In the specification, a portion in which the thickness of the adhesive layer AD becomes gradually thinner may be referred to as a slope. The slope of the adhesive layer AD may have a first length $d_s$. When the first length $d_s$ of the slope of the adhesive layer AD gets longer, the slope is visible in the outside of the display device ED to result in degradation of image quality. According to the invention, a contact angle of the adhesive layer AD is changed by introducing the ionic surfactant ISF to an adhesive composition for providing the adhesive layer AD, and applying a voltage to a specific portion of the adhesive composition to control the surface tension of the adhesive composition, which results in reducing the slope length of the adhesive layer AD.

Figure 7A:
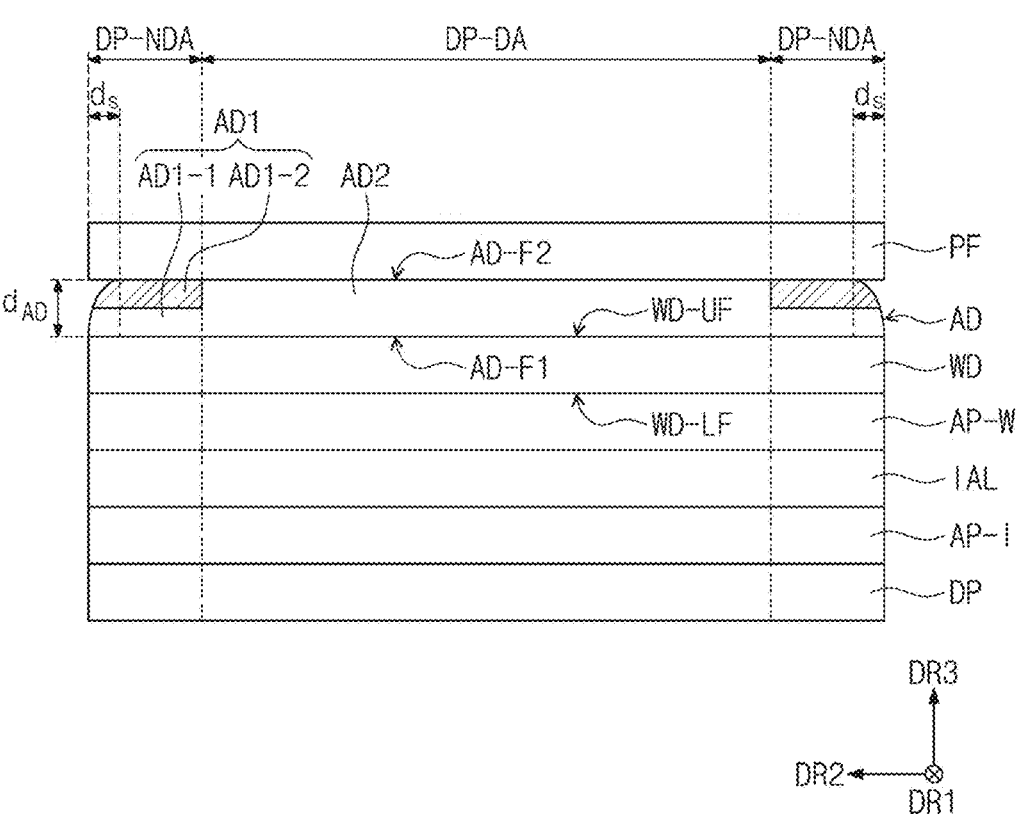
FIGS. 7A to 7C are cross-sectional views showing partial configurations of a display device according to an embodiment of the invention.
Figure 7B:
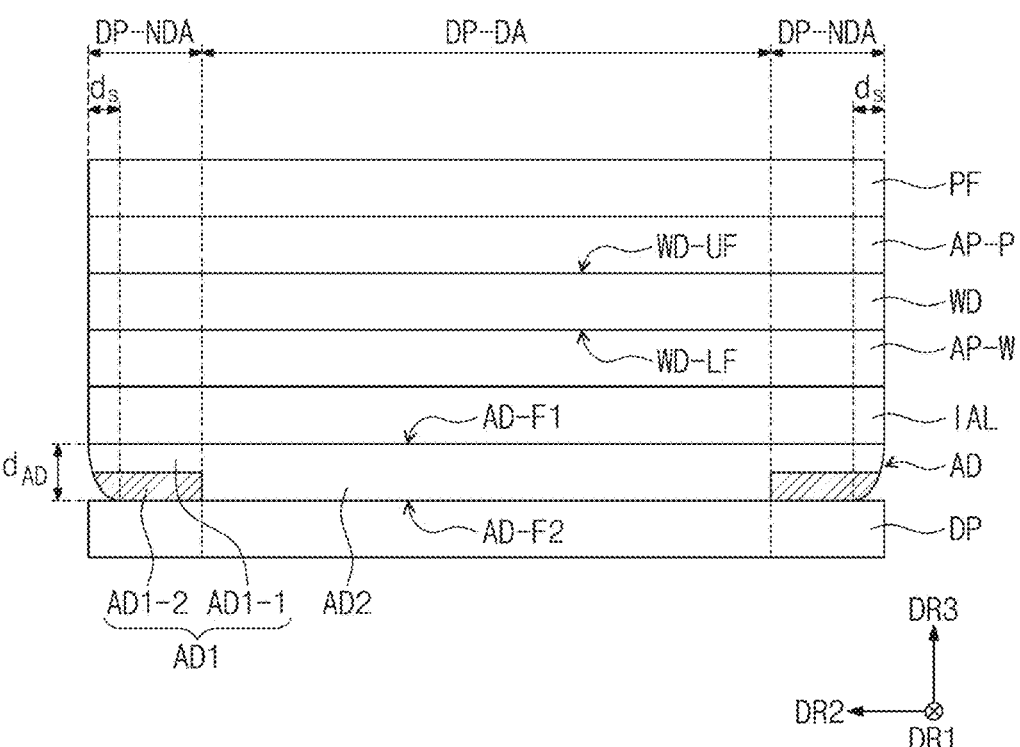
Figure 7C:
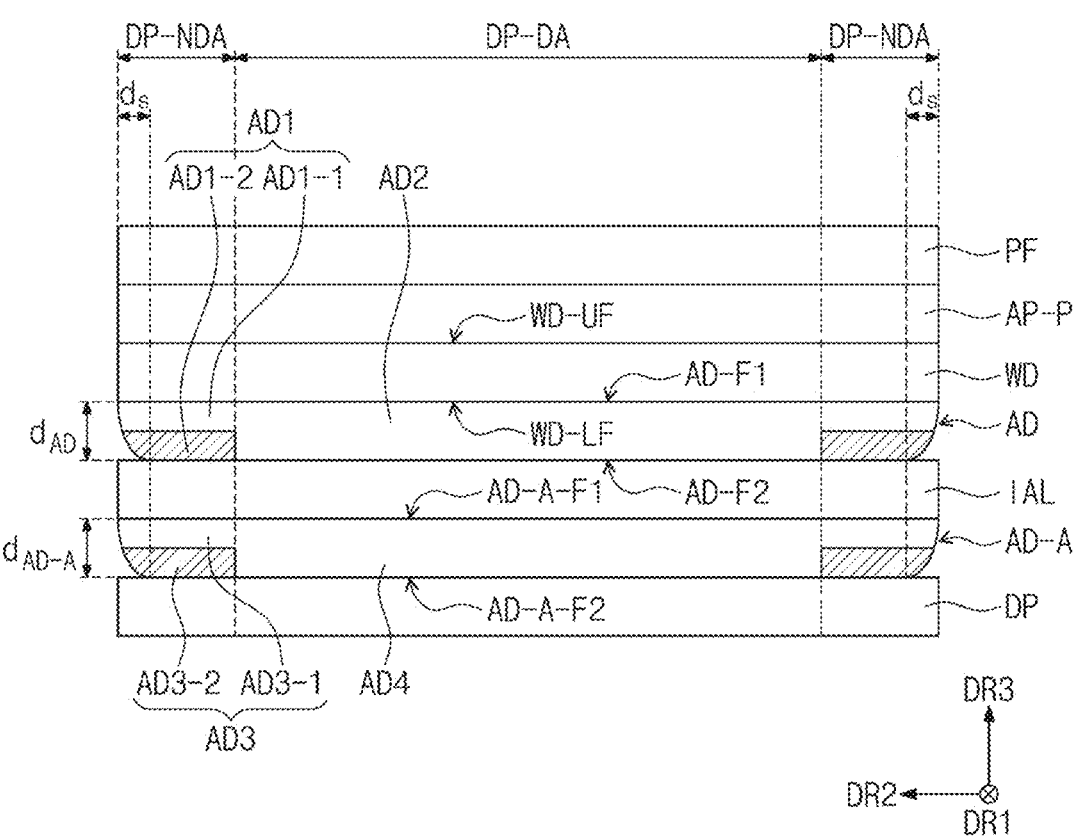

FIGS. 7A to 7C are cross-sectional views of the display device ED according to an embodiment of the invention. FIGS. 7A to 7C illustrate cross-sectional views of the display device ED cut along line I-I' of FIG. 3. Hereinafter, in describing the display device ED according to an embodiment with reference to FIGS. 7A to 7C, like reference numerals are given to like components described with reference to FIGS. 3, 4, 6A and 6B, and detailed descriptions thereabout will be omitted.

Referring to FIGS. 7A and 7B, the display device according to an embodiment may be different in disposition of the adhesive layer AD in comparison to the display device shown in FIG. 6A.

With reference to FIG. 7A, the adhesive layer AD may be disposed on the window WD. Specifically, the adhesive layer AD may be disposed between the window WD and the protection layer PF. A third upper adhesive layer AP-W may be disposed between the window WD and the upper protection film IAL. The third upper adhesive layer AP-W may include a typical adhesive or pressure adhesive. The third upper adhesive layer AP-W may be an OCA film or an OCR layer. The details described above with reference to FIGS. 6A and 6B may be equally applied to the adhesive layer AD shown in FIG. 7A.

The adhesive layer AD may include a first surface AD-F1 and a second surface AD-F2 facing the first surface AD-F1 in the third direction DR3. In an embodiment, the first surface AD-F1 of the adhesive layer AD may be disposed adjacent to the window WD. As shown in FIG. 7A, when the adhesive layer AD is disposed on the window WD, the first surface AD-F1 of the adhesive layer AD may contact the upper surface WD-UF of the window WD.

A concentration distribution of the ionic surfactant ISF may vary in the adhesive layer AD. The concentration of the ionic surfactant ISF may increase in a direction from the first surface AD-F1 of the adhesive layer AD toward the second surface AD-F2 of the adhesive layer AD. In other words, in the adhesive layer AD, the concentration of the ionic surfactant ISF may increase from the first surface AD-F1 in a direction away from the window WD.

In addition, the adhesive layer AD of an embodiment may include the first portion AD1 and the second portion AD2. The first portions AD1 of the adhesive layer AD is a portion in which the concentration of the ionic surfactant ISF may increase in a direction from the first surface AD-F1 toward the second surface AD-F2. In other words, the concentration distribution of the ionic surfactant ISF in the first portion AD1 may increase in a direction away from the window WD. The second portion AD2 of the adhesive layer AD may be a portion in which the concentration of the ionic surfactant ISF is constant in the third direction DR3 that is a thickness direction of the adhesive layer AD. In other words, in the second portion AD2 of the adhesive layer AD may have a uniform concentration distribution of the ionic surfactant ISF in a direction from the first surface AD-F1 of the adhesive layer AD toward the second surface AD-F2 of the adhesive layer AD.

On the other hand, at least one of the second upper adhesive layer AP-I or the third upper adhesive layer AP-W may be omitted in the display device ED shown in FIG. 7A.

Referring to FIG. 7B, the adhesive layer AD may be disposed between the upper protection film IAL and the display panel DP. The first upper adhesive layer AP-P may be disposed between the protection layer PF and the window WD, and the third upper adhesive layer AP-W may be disposed between the window WD and the upper protection film IAL. However, the embodiment of the invention is not limited thereto, and at least one of the first upper adhesive layer AP-P or the third upper adhesive layer AP-W may be omitted. The foregoing details about the adhesive layer AD in FIGS. 6A and 6B may be equally applied to that shown in FIG. 7B.

The adhesive layer AD may include a first surface AD-F1 and a second surface AD-F2 facing the first surface AD-F1 in the third direction DR3. In an embodiment, the first surface AD-F1 of the adhesive layer AD may be disposed adjacent to the window WD.

The upper protection film IAL may include a top surface and a bottom surface facing the upper surface. The top surface of the upper protection film IAL may be adjacent to the window WD, and the bottom surface of the upper protection film IAL may be adjacent to the display panel DP. The bottom surface of the upper protection film IAL may face the top surface of the upper protection film IAL in the third direction DR3. As shown in FIG. 7B, when the adhesive layer AD is disposed between the upper protection film IAL and the display panel DP, the first surface AD-F1 of the adhesive layer AD may contact the bottom surface of the upper protection film IAL.

With reference to FIG. 7C, the display device ED according to an embodiment may further include an additional adhesive layer AD-A in comparison to the display device ED shown in FIG. 6A. In other words, the display device ED of the embodiment may include an adhesive layer AD disposed between the window WD and the upper protection film IAL, and further include an additional adhesive layer AD-A disposed between the upper protection film IAL and the display panel DP. The foregoing details about the adhesive layer AD in FIGS. 6A and 6B may be equally applied to that shown in FIG. 7C.

The display device ED of an embodiment may further include the additional adhesive layer AD-A disposed between the display panel DP and the upper protection film IAL. The additional adhesive layer AD-A may include a third surface AD-A-F1 and a fourth surface AD-A-F2 facing the third surface AD-A-F1 in the third direction DR3. In an embodiment, the third surface AD-A-F1 of the additional adhesive layer AD-A may be adjacent to the window WD, and the fourth surface AD-A-F2 may be adjacent to the display panel DP. The third surface AD-A-F1 of the additional adhesive layer AD-A may contact the bottom surface of the upper protection film IAL.

The details described above with reference to FIGS. 6A and 6B may be equally applied to the additional adhesive layer AD-A shown in FIG. 7C. In other words, the additional adhesive layer AD-A may be different only in a disposition structure from the adhesive layer AD, and same in the configuration as the adhesive layer AD described above with reference to FIGS. 6A and 6B.

The additional adhesive layer AD-A may include the ionic surfactant ISF (see FIG. 6B). A concentration distribution of the ionic surfactant ISF may vary in the additional adhesive layer AD-A. The concentration of the ionic surfactant ISF (see FIG. 6B) may increase in a direction from the third surface AD-A-F1 toward the fourth surface AD-A-F2.

The additional adhesive layer AD-A of an embodiment may include a third portion AD3 and a fourth portion AD4. The third portion AD3 and the fourth portion AD4 in the additional adhesive layer AD-A may be divided according to the concentration distribution of the ionic surfactant ISF (see FIG. 6B).

The third portions AD3 of the additional adhesive layer AD-A is a portion in which the concentration of the ionic surfactant ISF may increase in a direction from the third surface AD-A-F1 toward the fourth surface AD-A-F2. In other words, the third portion AD3 of the additional adhesive layer AD-A has a concentration distribution of the ionic surfactant ISF (see 6B) increasing in a direction from the third surface AD-A-F1 toward the fourth surface AD-A-F2. In an embodiment, the concentration distribution of the ionic surfactant ISF (see FIG. 6B) in the third portion AD3 may increase in a direction away from the window WD.

The fourth portion AD4 of the additional adhesive layer AD-A may be a portion in which the concentration of the ionic surfactant ISF (see FIG. 6B) is constant in the third direction DR3 that is a thickness direction of the additional adhesive layer AD-A. In other words, in the fourth portion AD4, a concentration distribution of the ionic surfactant ISF (see 6B) is uniform in a direction from the third surface AD-A-F1 toward the fourth surface AD-A-F2.

The third portion AD3 of the additional adhesive layer AD-A may overlap the non-display area DP-NDA, and the fourth portion AD4 of the additional adhesive layer AD-A may overlap the display area DP-DA in the thickness direction (i.e., third direction DR3). In other words, the third portion AD3 of the additional adhesive layer AD-A may be provided by overlapping the non-display area DP-NDA, and the fourth portion AD4 of the additional adhesive layer AD-A may be provided by overlapping the display area DP-DA. FIG. 7C illustrates the additional adhesive layer AD-A as overlapping the entirety of the non-display area DP-NDA, but the embodiment of the invention is not limited thereto. For example, unlike what is shown in FIG. 7C, the additional adhesive layer AD-A may partially overlap the non-display area DP-NDA in another embodiment.

In an embodiment, the third portion AD3 of the additional adhesive layer AD-A may include a third sub-adhesive unit AD3-1 and a fourth sub-adhesive unit AD3-2. The third sub-adhesive unit AD3-1 may include the third surface AD-A-F1 of the additional adhesive layer AD-A, and the fourth sub-adhesive unit AD3-2 may include the fourth surface AD-A-F2 of the additional adhesive layer AD-A. The third sub-adhesive unit AD3-1 may be disposed adjacent to the window WD, and the fourth sub-adhesive unit AD3-2 may be disposed adjacent to the display panel DP. The fourth sub-adhesive unit AD3-2 may be provided to have a prescribed thickness in the third direction DR3, which is a thickness direction, from the fourth surface AD-A-F2 of the additional adhesive layer AD-A. The concentration of the ionic surfactant ISF (see FIG. 6B) in the fourth sub-adhesive unit AD3-2 may be greater than the concentration of the ionic surfactant ISF in the third sub-adhesive unit AD3-1.

In an embodiment, the thickness $d_{AD-A}$ of the additional adhesive layer AD-A may be about 35 μm to about 75 μm. For example, the thickness $d_{AD-A}$ of the additional adhesive layer AD-A may be about 40 μm to about 70 μm. When the thickness $d_{AD-A}$ of the additional adhesive layer AD-A is smaller than about 35 μm, the adhesive layer may not have a sufficient adhesive strength. When the thickness $d_{AD-A}$ of the additional adhesive layer AD-A is greater than about 75 μm, the additional adhesive layer AD-A is thick and thus the folding characteristics or bending characteristics of the flexible display device may be lowered. When the thickness $d_{AD-A}$ of the additional adhesive layer AD-A satisfies the foregoing range, the additional adhesive layer AD-A may show sufficient adhesive strength and excellent durability against bending deformation to be suitable to a foldable display device or a bending display device.

Figure 8A:
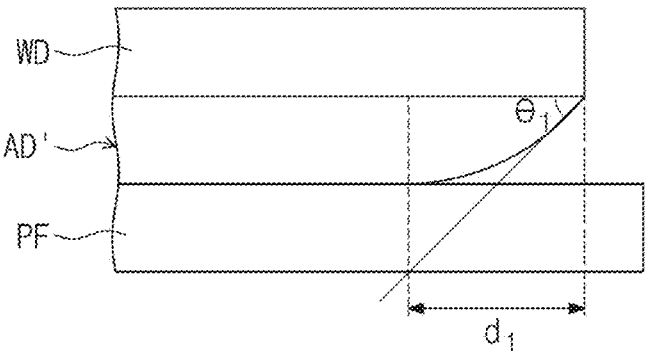
FIGS. 8A and 8B are cross-sectional views for explaining issues that may occur in a display device.
Figure 8B:
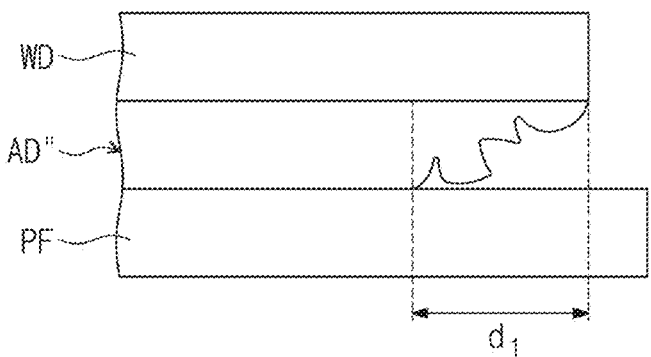

FIGS. 8A and 8B are cross-sectional views for explaining issues that may occur in a display device. The same reference numerals are given to the same components as those described in FIGS. 3 to 7C, and repetitive descriptions are omitted.

An adhesive is used for allowing each layer included in the display device ED to adhere to each other. When a pressure sensitive adhesive ("PSA") is used as such an adhesive, producing the display device is cumbersome and requires a high cost, and issues of manufacturing processes such as steaming in a puncturing process may also occur. In order to address such issues, a scheme for providing an adhesive layer to be applied to the display device ED in an inkjet printing manner or the like is being used. For such an inkjet printing manner or the like, an adhesive composition of low viscosity may be desirable for increasing jettability during discharge. When the viscosity of the adhesive composition is low, the adhesive composition applied on the substrate may be easily moved to increase a contact area between the substrate and the adhesive composition, but a contact angle between the substrate and the adhesive composition is reduced to provide a slope in which the thickness becomes gradually thinner in an edge portion.

For example, as shown in FIG. 8A, when the adhesive composition of low viscosity is provided on the window WD to provide an adhesive layer AD', the adhesive composition strongly tends to increase a contact area with the surface of the window WD to increase the contact area between the window WD and the adhesive composition. In this state, when the adhesive composition is cured to provide the adhesive layer AD', a contact angle θ1 between the window WD and the adhesive layer AD' is reduced to provide a slope in which the thickness becomes gradually thinner in the edge portion of the adhesive layer AD'. When the length dl of the slope becomes longer, as shown in FIG. 8B, a large deformation occurs in a slope portion after folding evaluation of the display device to provide a deformed adhesive layer AD". Accordingly, a curved slope of the deformed adhesive layer AD" is visible from the outside of the display device to lower the image quality.

Accordingly, when the adhesive composition of low viscosity is applied to provide the adhesive layer, in order to increase the uniformity and reduce the length of the slope in the edge portion of the adhesive layer, it may be effective to increase the surface tension of the adhesive composition in the edge portion. However, there is a limit in the characteristics of applicable materials in order to associate adhesive compositions, and it is very difficult to control the characteristics of the surface tension while satisfying various characteristics of the adhesive compositions such as viscosity, jettability, curing characteristics or the like desirable in the processes. According to the invention, ionic surfactant is introduced to an adhesive composition for providing an adhesive layer, a voltage is selectively applied on a substrate, and thus the length of the slope in the edge portion may be reduced while the uniformity of the thickness of the entire adhesive layer is improved.

Hereinafter, a manufacturing method of a display device according to an embodiment will be described with reference to FIGS. 9 and 10A to 10H. In describing the manufacturing method of a display device of the embodiment, the description about the display device of the forgoing embodiment may be applied. In describing the manufacturing method of a display device of the embodiment, repetitive details of the forgoing display device will not be described again, and the differences therefrom will be focused.

The manufacturing method of a display device of an embodiment may represent a method for manufacturing the display devices ED of the embodiments described in FIGS. 1 to 7C. The embodiment provides a manufacturing method of a display device including the adhesive layer AD disposed on the display panel DP of the display device ED.

Figure 9:
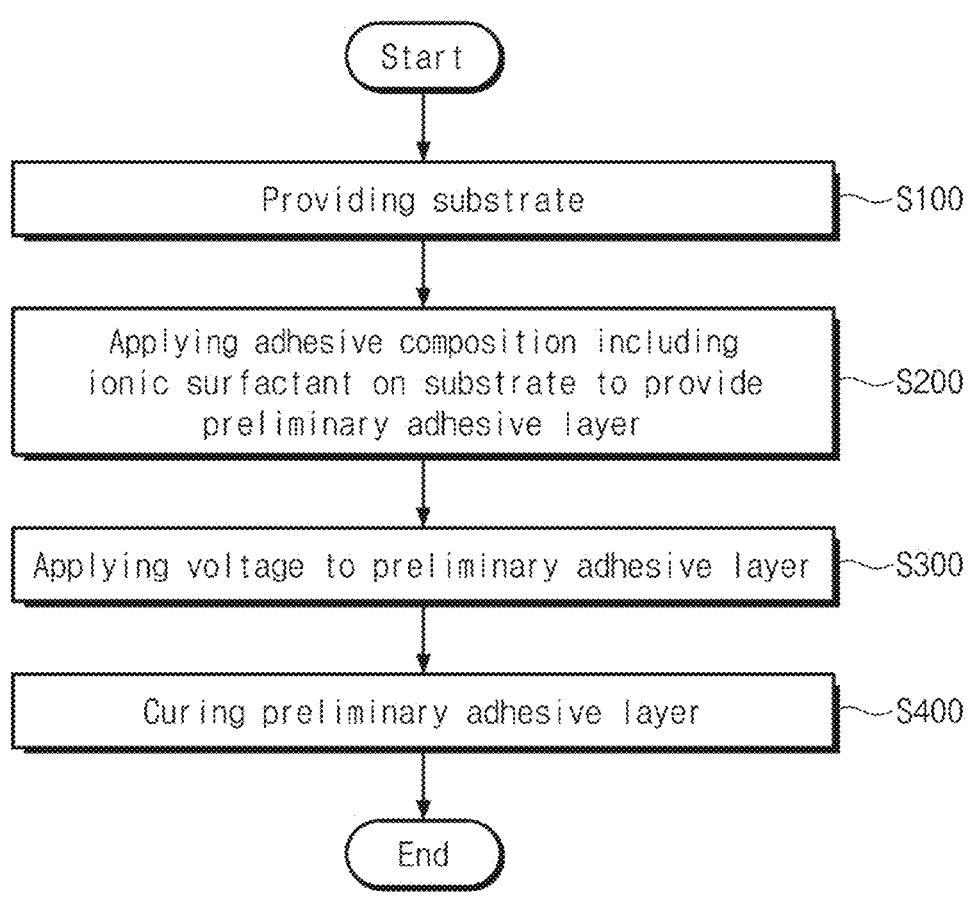
FIG. 9 is a flowchart illustrating a manufacturing method of a display device according to an embodiment of the invention.

FIG. 9 is a flowchart showing a manufacturing method of a display device according to an embodiment.

With reference to FIG. 9, a method for manufacturing a display device of an embodiment may include a step S100 for providing a substrate, a step S200 for applying an adhesive composition including an ionic surfactant on the substrate to provide a preliminary adhesive layer, a step S300 for applying a voltage to the preliminary adhesive layer, and a step S400 for curing the preliminary adhesive layer.

Figure 10A:
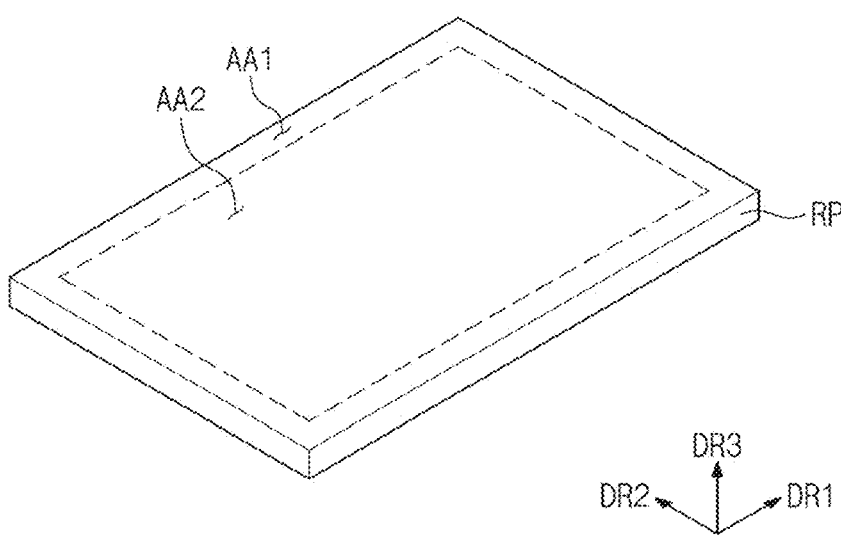
FIGS. 10A to 10H schematically show the steps of a manufacturing method of a display device according to an embodiment of the invention.
Figure 10B:
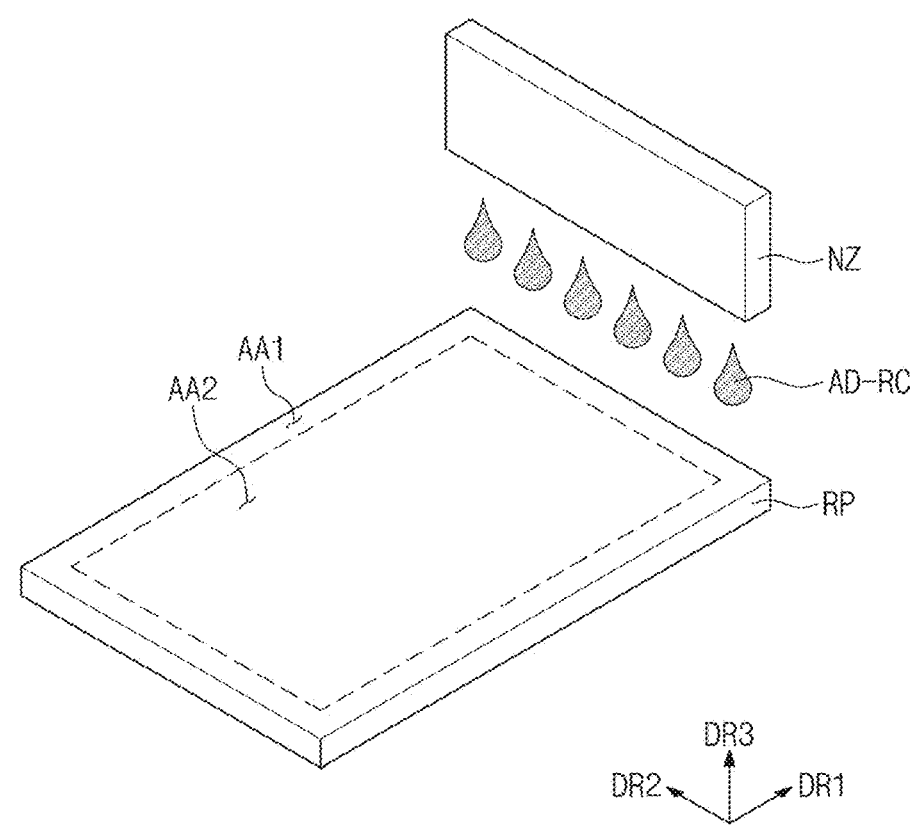
Figure 10C:
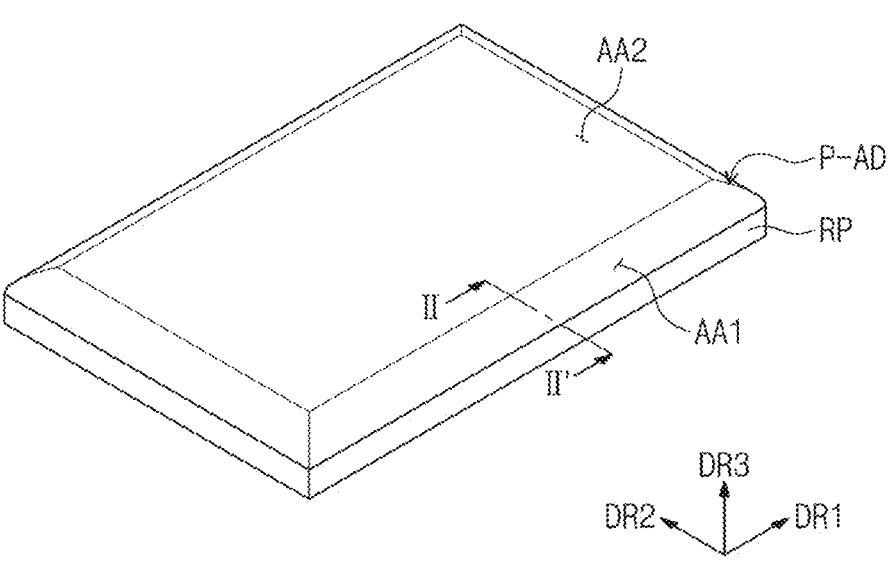
Figure 10D:
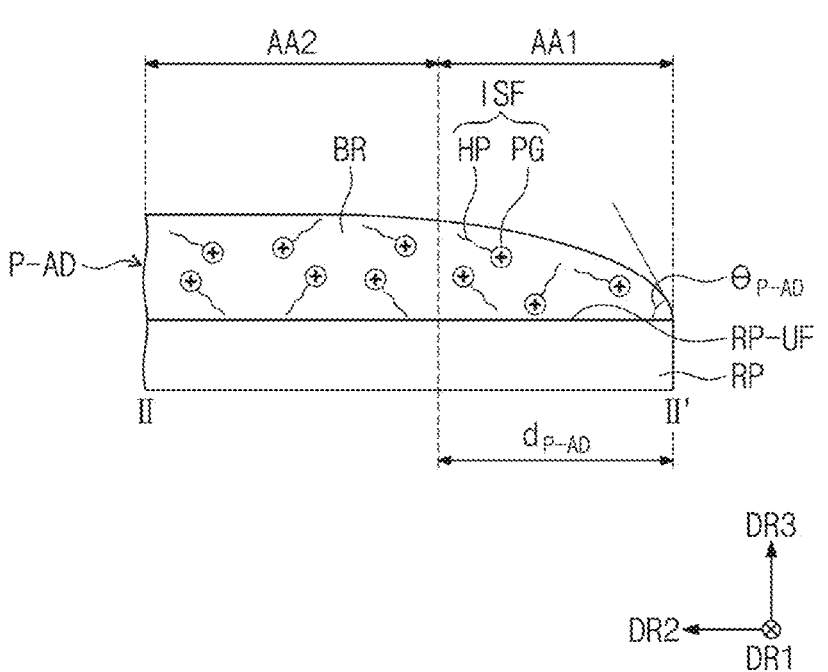
Figure 10E:
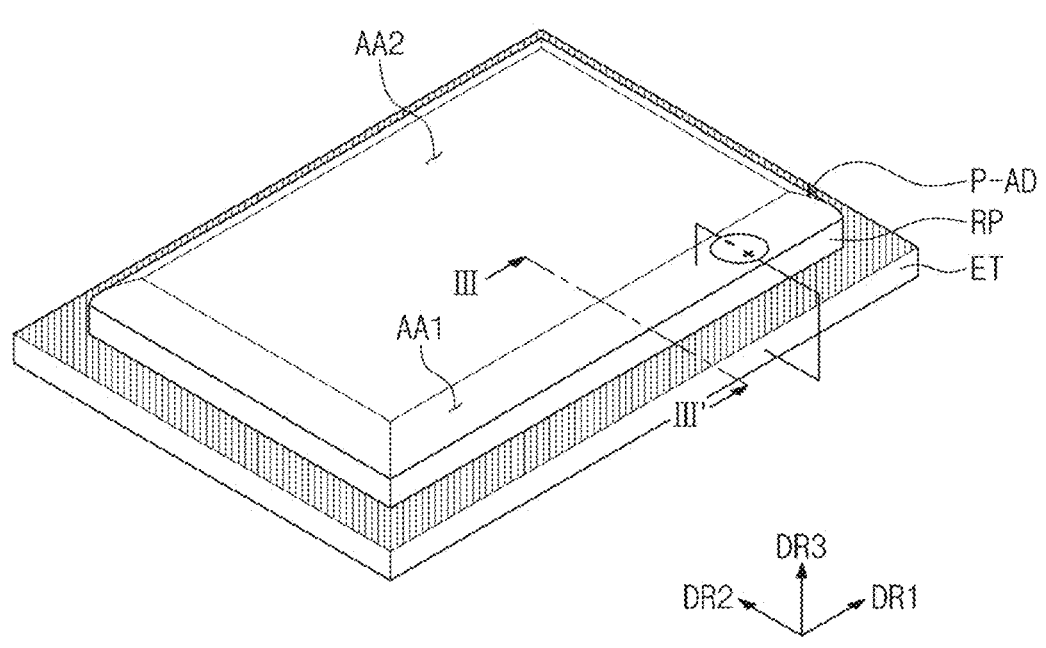
Figure 10F:
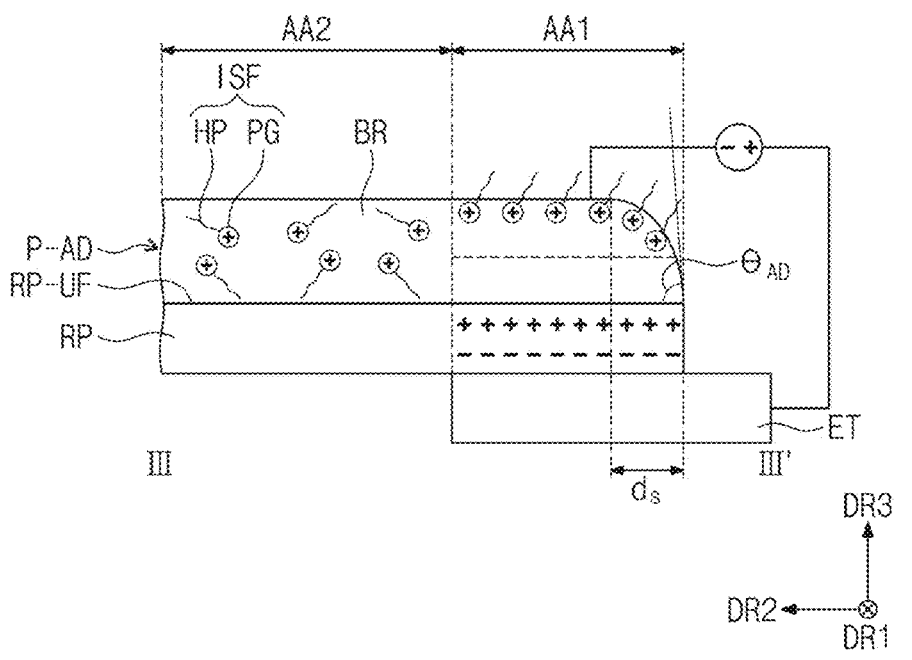
Figure 10G:
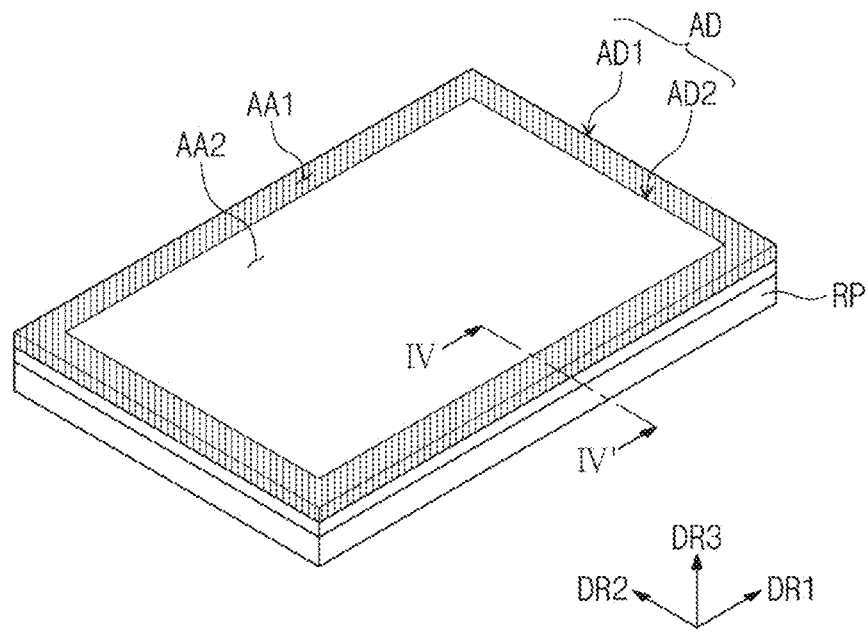
Figure 10H:
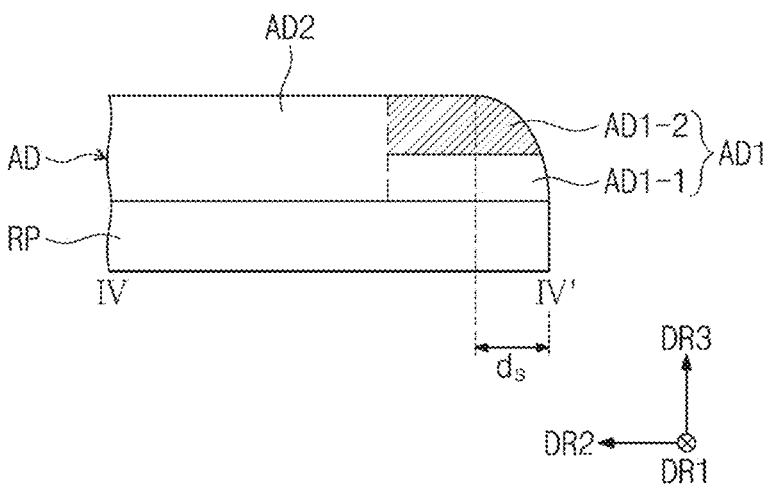

FIGS. 10A to 10H schematically show steps of manufacturing the adhesive layer AD according to an embodiment. FIG. 10A shows a step for providing a substrate RP, FIGS. 10B to 10D show steps for providing an adhesive composition AD-RC on the substrate RP to provide a preliminary adhesive layer P-AD, FIGS. 10E and 10F show steps for applying a voltage to the preliminary adhesive layer P-AD, and FIGS. 10G and 10H show steps for curing the preliminary adhesive layer P-AD to provide the adhesive layer AD.

The method for manufacturing a display device of an embodiment may include the step S100 for providing a substrate. Referring to FIG. 10A, the manufacturing method of a display device according to an embodiment may include a step for providing the substrate RP on which the adhesive layer AD (see FIG. 10G). The substrate RP may provide a reference surface on which the adhesive layer AD (see FIG. 10G) is provided. For example, the substrate RP may be the window WD described with reference to FIG. 6A.

Referring to FIG. 10A, the substrate RP may include a first area AA1 and a second area AA2. The first area AA1 may mean an area overlapping the preliminary layer P-AD in the thickness direction (see FIG. 10E) to which the voltage is applied in the step S300 for applying the voltage to the preliminary adhesive layer to be described below in the manufacturing method of the display device of the embodiment. In other words, the first area AA1 may mean an area overlapping an electrode ET (see FIG. 10E) disposed in the bottom of the substrate RP in the manufacturing method of the display device of the embodiment.

The first area AA1 may be adjacent to the second area AA2. For example, the first area AA1 may surround the second area AA2. However, the embodiment of the invention is not limited thereto, and the first area AA1 may be provided in various shapes. According to an embodiment, the first area AA1 of the substrate RP may correspond to at least a portion of the non-display area DP-NDA of the display panel DP (see FIG. 4).

Referring to FIGS. 10B to 10D, the adhesive composition AD-RC may be applied on the substrate RP to provide the preliminary adhesive layer P-AD. The adhesive composition AD-RC is provided in a liquid phase, and the preliminary adhesive layer P-AD may be a coating layer prior to being cured.

The adhesive composition AD-RC may include a base resin BR and the ionic surfactant ISF. The adhesive composition AD-RC may be applied on the first area AA1 and the second area AA2 of the substrate RP. Before applying a voltage to the preliminary adhesive layer P-AD, the ionic surfactant ISF included in the preliminary adhesive layer P-AD may be uniformly distributed and disposed on the base resin BR. The base resin BR may include an acrylic-based resin, a urethane-based resin, a fluorine-based resin, an epoxy-based resin, a polyester-based resin, a polyamide-based resin, a silicone-based resin, or a combination thereof. The adhesive composition AD-RC may include an uncured oligomer or monomer. The uncured oligomer or monomer may include a cross-linking reactor. In addition, the adhesive composition AD-RC may include an initiator. The type of the initiator is not particularly limited as long as it promotes the curing reaction, and may be, for example, a thermal initiator or a light initiator.

In an embodiment, the adhesive composition AD-RC may include at least one light initiator. In an embodiment, the light initiator may be activated by light in the ultraviolet ("UV") band. The light initiator may be activated by UV light having the central wavelength in a wavelength band of about 100 nm to about 400 nm. When the adhesive composition AD-RC has a plurality of light initiators, different light initiators may be activated by UV light in bands having different central wavelengths. The central wavelength in the present specification indicates a wavelength at which an emission peak in an emission spectrum of a light source shows a maximum intensity.

The light initiator may be any one selected from among 2,2-dimethoxy-1,2-diphenylethan-1-one, 1-hydroxy-cyclohexyl-phenyl-ketone, 2-hydroxy-2-methyl-1-phenyl-1-propanone,2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

In addition, the light initiator may be any one selected from among (2-methyl-1-[4-(methylthio)phenyl]-2-morpholinopropan-1-one, 2-benzyl-2-dimethylamino-1-(4-morpholinophenyl)-butanone-1), 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethyl-benzoyl)-phenylphosphineoxide, 4-phenylsulfanylbenzoyl) heptylideneamino]benzoate, [1-[9-ethyl-6-(2-methylbenzoyl)carbazol-3-yl]ethylideneamino] acetate, and Bis(2,4-cyclopentadienyl)bis [2,6-difluoro-3-(1-pyrryl)phenyl] titanium(IV). However, the embodiment of the invention is not limited thereto.

The adhesive composition AD-RC may further include an additive. As the additive, a typical additive known in the art may be suitably selected for adjusting the property desirable for the adhesive composition. For example, a light stabilizer, a cross-linking agent, an anti-oxidant compound, a chain transfer agent, a photosensitizer, a polymerization inhibitor, a leveling agent, an adhesive imparting agent, a plasticizer, a UV absorber, a storage stabilizer, an antistatic agent, an inorganic filler, a pigment, a dye or the like may be enumerated, but the embodiment of the invention is not limited thereto. The additive may be used solely or a mixture of two kinds of them may be used.

In an embodiment, as a method for applying the adhesive composition AD-RC, an inkjet printing manner can be adopted. The adhesive composition AD-RC may be provided through a nozzle NZ, and provided to maintain a constant coating thickness on the substrate RP.

For excellent jettability in the inkjet printing manner or the like, a material of relatively low viscosity may be desirable. In an embodiment, the viscosity of the adhesive composition AD-RC may be about 10 centipoises (cP) to 50 cP at a room temperature (25° C.). In a case where the viscosity of the adhesive composition AD-RC is smaller than about 10 cP, when the adhesive composition AD-RC is applied on the substrate RP, an issue that the adhesive composition AD-RC flows out from an end portion of a side surface of the substrate RP may occur. In addition, in a case where the viscosity of the adhesive composition AD-RC is greater than about 50 cP, the high viscosity may make the application in the inkjet manner difficult and the spread of the adhesive composition AD-RC difficult on the substrate RP. Therefore, it is difficult to provide the adhesive layer AD with uniform composition.

As shown in FIG. 10D, the preliminary adhesive layer P-AD has a flat top surface in the second area AA2, and, in the first area AA1, has the thickness becoming gradually thinner toward an edge portion in the third direction DR3. Prior to the application of the voltage, the portion with the thickness becoming gradually thinner in the preliminary adhesive layer P-AD may be called as a first slope. A first slope of the preliminary adhesive layer P-AD may have a second length $d_{P-AD}$ in the second direction DR2. In an embodiment, the second length $d_{P-AD}$ may be about 80 μm to about 250 μm.

Prior to the application of the voltage, the preliminary adhesive layer P-AD may have a first contact angle $\theta_{P-AD}$. Prior to the application of the voltage, the first contact angle $\theta_{P-AD}$ between the top surface RP-UF and the preliminary adhesive layer P-AD may be about 30 degrees (°) to about 60°. For example, the first contact angle may be about 45° to 50°.

Referring to FIGS. 10E and 10F, after the preliminary adhesive layer P-AD is provided on the substrate RP, an electrode ET may be provided to apply the voltage to the preliminary adhesive layer P-AD. The electrode ET may be disposed on the bottom of the substrate RP for applying the voltage to the preliminary adhesive layer P-AD. In an embodiment, the electrode ET may be disposed on the bottom of the substrate RP so as to overlap the first area AA1 of the substrate RP in the thickness direction. The electrode ET may non-overlap the second area AA2 of the substrate RP. On the other hand, FIGS. 10A to 10F illustrate the electrode ET as being disposed on the bottom of the substrate RP after the preliminary adhesive layer P-AD is defined, but the embodiment of the invention is not limited thereto. For example, before the adhesive composition AD-RC for defining the preliminary adhesive layer P-AD is applied on the substrate RP, the electrode ET may be disposed on the bottom of the substrate RP.

The electrode ET may be disposed on the rear surface of the substrate RP. The electrode ET may be composed of a conductive material. The electrode ET may have electrically different polarities. (+) polarity is defined in one side of the electrode ET, and (−) polarity is defined in the other side. A positive electrode may be connected to any one of the electrode ET or the preliminary adhesive layer P-AD, and a negative electrode may be connected to the other.

In order to secure the uniformity of the adhesive layer AD and control the length of the slope in the edge portion, it is desirable to control the contact angle between the preliminary adhesive layer P-AD in the edge portion and the substrate RP. In the invention, the shape of the edge portion of the preliminary adhesive layer P-AD overlapping the first area AA1 in the thickness direction may be changed using an electro-dewetting phenomenon. As the shape of the edge portion of the preliminary adhesive layer P-AD overlapping the first area AA1 is changed, the contact angle between the substrate RP and the preliminary adhesive layer P-AD may change. An electro-wetting phenomenon occur in the preliminary adhesive layer P-AD overlapping the first area AA1, and thus the contact angle between the substrate RP and the preliminary adhesive layer P-AD may change.

Referring to FIG. 10F, the ionic surfactant ISF may include a hydrophobic group HP and a hydrophilic group PG. The ionic surfactant ISF may play a role of increasing the surface tension acting on the top surface of the preliminary adhesive layer P-AD. A control for the contact angle between the preliminary adhesive layer P-AD and the substrate RP may be more efficiently achieved by applying a voltage having the same polarity as the hydrophilic group of the ionic surfactant to the electrode ET. FIGS. 10D to 10F illustrate that the ionic surfactant ISF is a cationic surfactant with positive ions as a hydrophilic group PG, but the embodiment of the invention is not limited thereto. The ionic surfactant ISF may be an anionic surfactant with negative ions as a hydrophilic group PG.

The hydrophilic group PG of the ionic surfactant ISF may have the polarity opposite to that of charges applied to the preliminary adhesive layer P-AD. The hydrophilic group PG of the ionic surfactant ISF may have the polarity same as that of charges applied to the electrode ET, and opposite to that of the charges applied to the preliminary adhesive layer P-AD. For example, as shown in FIG. 10F, when the ionic surfactant ISF includes the hydrophilic group PG of (+) charges, (−) charges are applied to the preliminary adhesive layer P-AD, and (+) charges are applied to the electrode ET. Accordingly, different charges are accumulated in the interface between the electrode ET and the substrate RP and the interface between the substrate RP and the preliminary adhesive layer P-AD, and thus the contact angle of the preliminary adhesive layer P-AD is changed by an electrostatic force between the hydrophilic group PG of the ionic surfactant ISF and the charges accumulated in the interface between the substrate RP and the preliminary adhesive layer P-AD.

With reference to FIG. 10F, due to the repulsion between the hydrophilic group PG of the ionic surfactant ISF and the charges accumulated in the interface between the substrate RP and the preliminary adhesive layer P-AD in the first area AA1, the ionic surfactant ISF may move to the top portion of the preliminary adhesive layer P-AD. As the result, the wetting of the preliminary adhesive layer P-AD may change in the first area AA1. Specifically, the surface tension between the preliminary adhesive layer P-AD and an external gas increases in the first area AA1 to increase the contact angle between the surface RP and the preliminary adhesive layer P-AD. When the voltage is applied, the preliminary adhesive layer P-AD may have a second contact angle $\theta_{AD}$. When the voltage is applied to the preliminary adhesive layer P-AD, the second contact angle $\theta_{AD}$ between the top surface RP-UF of the substrate RP and the preliminary adhesive layer P-AD may be at least about 65°. For example, the second contact angle $\theta_{AD}$ may be about 65° to about 90°. In an embodiment, the second contact angle $\theta_{AD}$ of the preliminary adhesive angle P-AD after the application of the voltage may be greater than the first contact angle $\theta_{P\text{-}AD}$ of the preliminary adhesive angle P-AD before the application of the voltage.

As the contact angle between the preliminary adhesive layer P-AD and the substrate RP increases during the application of the voltage, the length of the slope may be reduced. As shown in FIG. 10F, the preliminary adhesive layer P-AD has a flat top surface in the second area AA2 during the application of the voltage, and the thickness of the first area AA1 may become gradually thinner in the third direction DR3 toward the edge portion of the preliminary adhesive layer P-AD. During the application of the voltage, the portion with the thickness becoming gradually thinner in the preliminary adhesive layer P-AD may be called as a second slope. The second slope of the preliminary adhesive layer P-AD may have a first length $d_s$. In an embodiment, the first length $d_s$ may be smaller than about 80 μm. For example, the first length $d_s$ may be about 0.1 μm to about 80 μm. In an embodiment, the first length $d_s$ of the preliminary adhesive layer P-AD after the application of the voltage may be smaller than the second length $d_{P\text{-}AD}$ of the preliminary adhesive layer P-AD before the application of the voltage.

In the step for applying the voltage to the preliminary adhesive layer P-AD, the magnitude of the voltage and/or the area of the first area AA1 in which the electrode ET is disposed may be adjusted to adjust the concentration distribution of the ionic surfactant ISF existing in the preliminary adhesive layer P-AD. As shown in FIG. 10F, the electrode ET is disposed to overlap only the first area AA1 of the substrate RP in the thickness direction, and thus the ionic surfactant ISF included in the preliminary adhesive layer P-AD overlapping the first area AA1 may be moved to one side of the preliminary adhesive layer P-AD according to the application of the voltage. Specifically, according to the application of the voltage, the ionic surfactant ISF included in the preliminary adhesive layer P-AD overlapping the first area AA1 may be moved to the top portion of the preliminary adhesive layer P-AD. Here, the degree of the movement of the ionic surfactant ISF may be adjusted according to the area of the first area AA1 overlapping the electrode ET and/or the magnitude of the applied voltage, etc. Accordingly, in the first sub-adhesive unit AD1-1 and the second sub-adhesive unit AD1-2 provided thereafter, the concentration of the ionic surfactant ISF may be adjusted. In other words, the first concentration of the ionic surfactant ISF in the second sub-adhesive unit AD1-2 and the second concentration of the ionic surfactant ISF in the first sub-adhesive unit AD1-1 may be determined by the area in which the electrode ET overlaps the substrate RP in the thickness direction, the magnitude of the applied voltage, or the like.

The electrode ET may not be disposed in the bottom of the second area AA2 of the substrate RP. As the electrode ET is not disposed in the bottom of the second area AA2 of the substrate RP, the ionic surfactant ISF included in the preliminary adhesive layer P-AD overlapping the second area AA2 in the thickness direction may be uniformly dispersed and disposed. The surface tension in the top surface of the preliminary adhesive layer P-AD overlapping the second area AA2 may be smaller in comparison to that in the top surface of the preliminary adhesive layer P-AD overlapping the first area AA1. Accordingly, the uniformity of the thickness of the preliminary adhesive layer P-AD overlapping the second area AA2 in the thickness direction may be improved.

With reference to FIGS. 10E to 10G, the manufacturing method of the display device ED according to the embodiment includes a step for curing the preliminary adhesive layer P-AD to provide the adhesive layer AD. Light may be irradiated on the entire surface of the preliminary adhesive layer P-AD, and the preliminary adhesive layer P-AD including a light initiator may be cured by the light. For example, the preliminary adhesive layer P-AD may be cured by UV light. However, the embodiment of the invention is not limited thereto, and when the preliminary adhesive layer P-AD includes a thermal initiator, the entire surface of the preliminary adhesive layer P-AD may be heated and the preliminary adhesive layer P-AD may be cured by the heat.

In an embodiment, the step S300 for applying the voltage to the preliminary adhesive layer may be substantially simultaneously performed with the step S400 for curing the preliminary adhesive layer. As shown in FIG. 10E, the voltage may be applied to a portion of the preliminary adhesive layer P-AD overlapping the first area AA1 to move the ionic surfactant ISF to the top portion of the preliminary adhesive layer P-AD, and, at the substantially same time, the preliminary adhesive layer P-AD may be cured to fix a disposition state of the ionic surfactant ISF. Accordingly, the preliminary adhesive layer P-AD in the first area AA1 may be separated into a preliminary second layer including most of the ionic surfactant ISF and a preliminary first layer including the ionic surfactant ISF having a lower concentration than the preliminary second layer or not including the ionic surfactant ISF. The preliminary second layer and the preliminary first layer are cured to provide the second sub-adhesive unit AD1-2 and the first sub-adhesive unit AD1-1 as shown in FIGS. 10G and 10H. Although not shown in the drawings, the adhesive layer AD manufactured with the steps shown in FIGS. 10A to 10H may be applied to the foregoing display device ED. For example, one surface of the adhesive layer AD manufactured with the steps shown in FIGS. 10A to 10H may be attached onto the foregoing display panel DP or the upper protection film IAL, and the substrate RP may be the window WD or the upper protection film IAL.

For excellent jettability in the inkjet printing manner or the like, an adhesive composition of a relatively low viscosity may be desirable. However, when a low viscosity material is applied on the substrate, a contact area between the substrate and the adhesive composition may increase, but the contact angle between the substrate and the adhesive composition tends to be smaller. Therefore, a slope in which the thickness of the adhesive layer becomes gradually thinner may be provided in an edge portion of the adhesive layer provided after being cured. When such a length of the slope is longer, the slope is visible from the outside of the display device to lower the image quality.

In the invention, the viscosity of the adhesive composition for providing the adhesive layer is controlled to be a prescribed value or smaller, a process for applying the voltage to the adhesive composition applied on the substrate is performed in the curing process, and thus the contact angle between the substrate and the adhesive layer may be maintained in a certain range or greater. In addition, by introducing the ionic surfactant to the adhesive composition for providing the adhesive layer, the contact area in the interface between the substrate and the adhesive layer may be increased, the contact angle between the substrate and the adhesive layer may be greatly increased in an end portion of a side, and thus the length of the slope provided in the edge portion of the adhesive layer is reduced. Therefore, the durability and the reliability of the display device ED may be improved.

What is claimed is:

1. A display device comprising:
a display panel comprising a display area and a non-display area surrounding the display area;
a window on the display panel; and
an adhesive layer disposed on the display panel and comprising an ionic surfactant,
wherein the adhesive layer comprises a first surface adjacent to the window, a second surface facing the first surface, and a first portion in which a concentration of the ionic surfactant increases in a direction from the first surface toward the second surface,
wherein the adhesive layer further comprises a second portion adjacent to the first portion,
wherein, in the second portion, a concentration of the ionic surfactant is uniform in a thickness direction of the adhesive layer.

2. The display device of claim 1, wherein the first portion overlaps the non-display area.

3. The display device of claim 1, wherein the second portion overlaps the display area.

4. The display device of claim 1, wherein the first portion surrounds the second portion in a view in the thickness direction.

5. The display device of claim 1, wherein the first portion comprises:
a first sub-adhesive unit including the first surface; and
a second sub-adhesive unit including the second surface,
wherein a concentration of the ionic surfactant in the second sub-adhesive unit is greater than a concentration of the ionic surfactant in the first sub-adhesive unit.

6. The display device of claim 5, wherein the first sub-adhesive unit does not comprise the ionic surfactant.

7. The display device of claim 1, wherein the adhesive layer is disposed between the display panel and the window.

8. The display device of claim 1, wherein the adhesive layer is disposed on the window.

9. The display device of claim 1, further comprising:
a protection film between the display panel and the window,
wherein the adhesive layer is disposed between the display panel and the protection film, or between the window and the protection film.

10. The display device of claim 9, wherein the adhesive layer is disposed between the window and the protection film, and the display device further comprises an additional adhesive layer disposed between the display panel and the protection film and comprising the ionic surfactant,
wherein the additional adhesive layer comprises a third surface adjacent to the protection film, a fourth surface facing the third surface, and a third portion in which a concentration of the ionic surfactant increases in a direction from the third surface toward the fourth surface.

11. The display device of claim 1, wherein the ionic surfactant comprises at least one among dodecyl trimethyl ammonium bromide, cetyltrimethyl ammonium bromide, tetradecyltrimethylammonium bromide, sodium dodecyl sulfate.

12. A display device comprising:
a display panel;
a window on the display panel;
a protection film between the display panel and the window;
an adhesive layer disposed between the protection film and the window and comprising an ionic surfactant; and
additional adhesive layer disposed between the display panel and the protection film and comprising the ionic surfactant,
wherein a concentration of the ionic surfactant in the adhesive layer increases in a direction from one surface of the adhesive layer adjacent to the window toward an opposite surface of the adhesive layer adjacent to the protection film,
wherein a concentration of the ionic surfactant in the additional adhesive layer increases in a direction from one surface of the additional adhesive layer adjacent to the protection film toward an opposite surface of the additional adhesive layer adjacent to the display panel.

* * * * *